US011545184B1

(12) United States Patent
Biskeborn

(10) Patent No.: US 11,545,184 B1
(45) Date of Patent: Jan. 3, 2023

(54) JOINED MULTI-MODULE TAPE RECORDING HEAD

(71) Applicant: Western Digital Technologies, Inc., San Jose, CA (US)

(72) Inventor: Robert G. Biskeborn, Hollister, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/706,335

(22) Filed: Mar. 28, 2022

(51) Int. Cl.
G11B 21/10 (2006.01)
G11B 5/008 (2006.01)

(52) U.S. Cl.
CPC ........ *G11B 21/103* (2013.01); *G11B 5/00813* (2013.01)

(58) Field of Classification Search
None
See application file for complete search history.

(56) References Cited

U.S. PATENT DOCUMENTS

| | | | |
|---|---|---|---|
| 3,573,769 A | | 4/1971 | Flora |
| 4,685,005 A | | 8/1987 | Fields, Jr. |
| 5,218,498 A | * | 6/1993 | Jagielinski ........... G11B 5/4893 |
| 5,436,780 A | | 7/1995 | Nagata et al. |
| 6,122,147 A | | 9/2000 | Fahimi et al. |
| 6,433,959 B1 | | 8/2002 | Lakshmikumaran et al. |
| 6,570,738 B1 | | 5/2003 | McKinstry |
| 6,690,542 B1 | * | 2/2004 | Wang .................... G11B 5/3103 |
| 7,167,339 B2 | | 1/2007 | Biskeborn et al. |
| 7,171,740 B2 | | 2/2007 | Biskeborn |
| 7,342,738 B1 | * | 3/2008 | Anderson .............. G11B 5/584 |
| 7,602,579 B2 | | 10/2009 | Biskeborn et al. |
| 7,894,161 B2 | | 2/2011 | Biskeborn |
| 8,542,460 B2 | | 9/2013 | Biskeborn et al. |

(Continued)

FOREIGN PATENT DOCUMENTS

EP 0492848 A2 7/1992
WO 2001075874 A2 10/2001

OTHER PUBLICATIONS

Kahwaty, VN et al., "Wafer Design Techniques for Same-Gap-Servo Head", IBM, Mar. 31, 2005, pp. 1-2, <https://priorart.ip.com/IPCOM/000117067/Wafer-Design-Techniques-for-Same-Gap-Servo-Head>.

(Continued)

*Primary Examiner* — Peter Vincent Agustin
(74) *Attorney, Agent, or Firm* — Patterson & Sheridan, LLP; Steven H. VerSteeg

(57) ABSTRACT

The present disclosure is generally related to a tape drive comprising a tape head and a controller. The tape head comprises a first assembly and a second assembly disposed adjacent to the first assembly, each assembly comprising a write module comprising a plurality of write heads and a read module comprising a plurality of read heads. When a tape moves in a first direction, the controller is configured to control the tape head to write data to the tape using the write module of the first module and read data from the tape using the read module of the first assembly. When the tape moves in a second direction opposite the first direction, the controller is configured to control the tape head to write data to the tape using the write module of the second module and read data from the tape using the read module of the second assembly.

21 Claims, 16 Drawing Sheets

(56) References Cited

U.S. PATENT DOCUMENTS

| | | | |
|---|---|---|---|
| 9,305,580 | B2 | 4/2016 | Cherubini et al. |
| 9,721,601 | B2 | 8/2017 | Biskeborn et al. |
| 2002/0186505 | A1* | 12/2002 | Biskeborn ............ G11B 5/3967 360/129 |
| 2005/0254170 | A1 | 11/2005 | Dugas et al. |
| 2007/0133130 | A1 | 6/2007 | Biskeborn |
| 2008/0212232 | A1 | 9/2008 | Biskeborn |
| 2009/0185314 | A1 | 7/2009 | Hachisuka |
| 2009/0207524 | A1 | 8/2009 | Koeppe |
| 2009/0310248 | A1 | 12/2009 | Hachisuka |
| 2015/0092291 | A1* | 4/2015 | Cherubini .............. G11B 5/584 360/48 |
| 2016/0111120 | A1 | 4/2016 | Engelen et al. |
| 2018/0277152 | A1 | 9/2018 | Biskeborn et al. |
| 2022/0319540 | A1* | 10/2022 | Biskeborn .......... G11B 5/00813 |

OTHER PUBLICATIONS

Biskeborn, Robert G. et al., "Head and Interface for High Areal Density Tape Recording", IEEE Transaction on Magnetics, Nov. 2012, <https://www.researchgate.net/publication/260572505_Head_and_Interface_for_High_Areal_Density_Tape_Recording>.

Shimizu, Osamu et al., "The Role of Tape Technology in Managing the Exponential Growth of Cold Data", Data Storage Innovation Conference, Jun. 13-15, 2016, pp. 1-40, <https://www.snia.org/sites/default/files/DSI/2016/presentations/Osamu_Shimizu_Role_of_Tape_Technology_rev.pdf>.

* cited by examiner

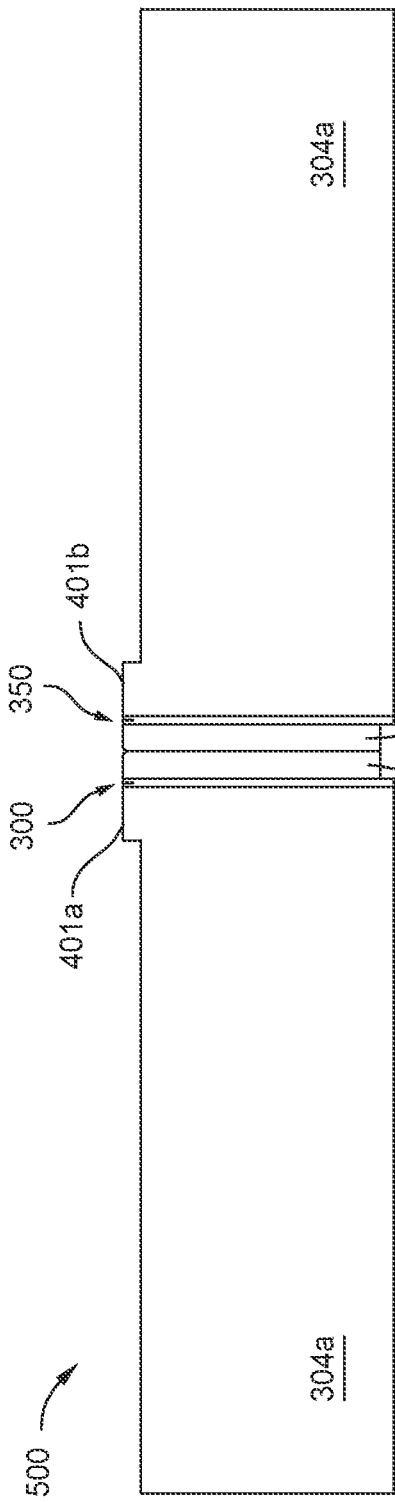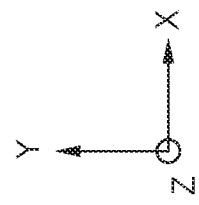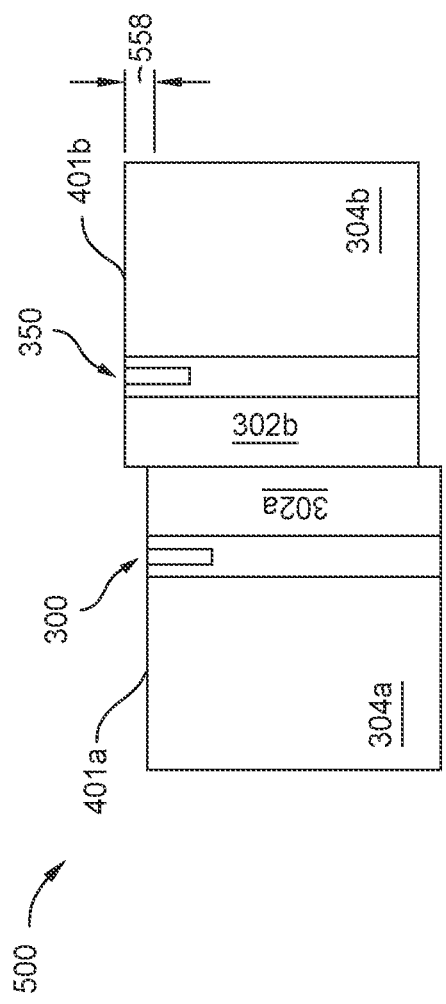
FIG. 5A
FIG. 5B

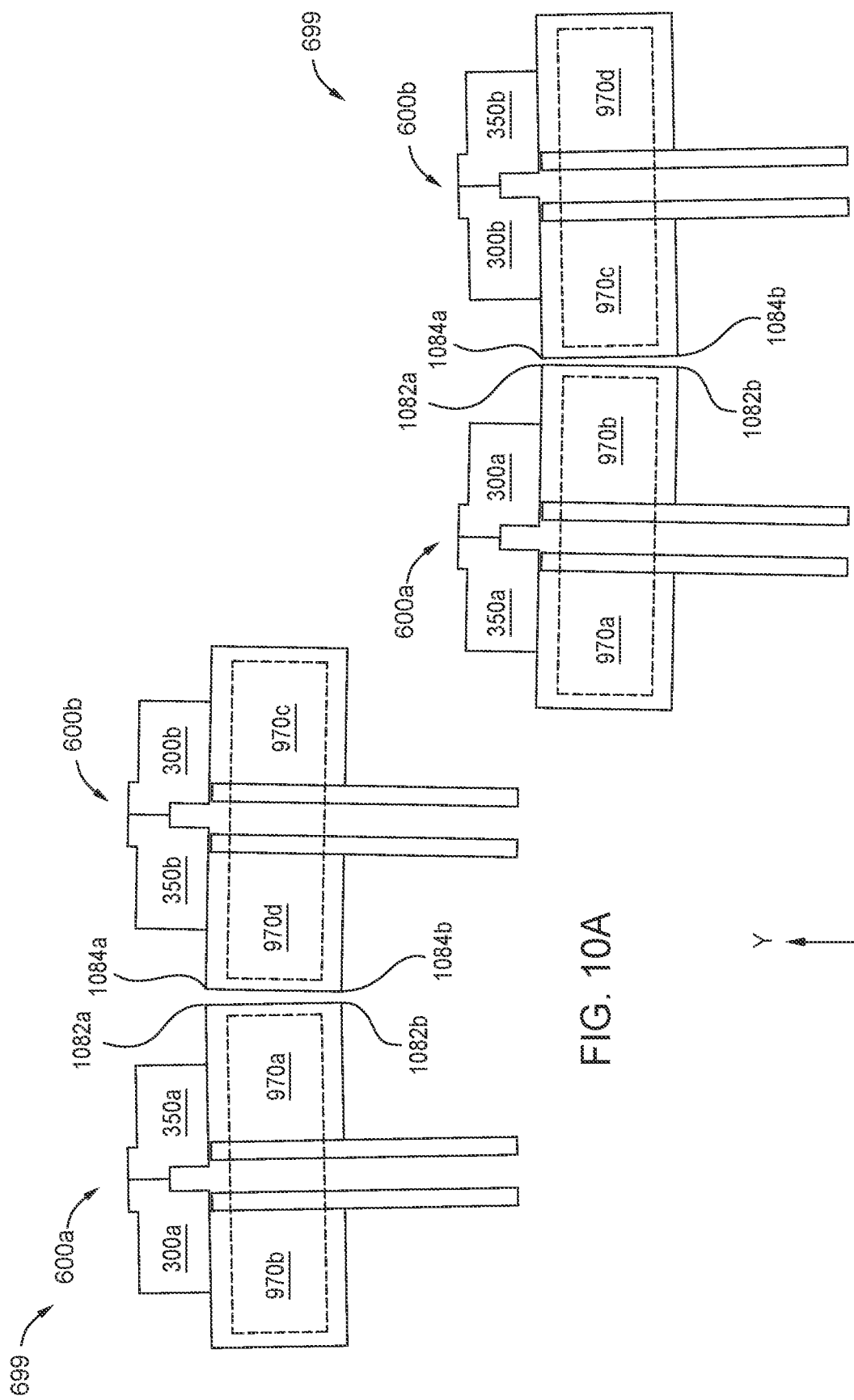

JOINED MULTI-MODULE TAPE RECORDING HEAD

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

To position the tape head accurately when reading from and writing to a magnetic tape, servo heads are used to read servo positioning information from servo tracks on the tape. The servo tracks comprising the positioning information are written to the tape once, at the media factory, at the beginning of the life of the tape. However, tapes may stretch and/or compress both in tape length and width over time, referred to as tape dimensional stability (TDS) effects, due to a variety of reasons, such as environmental causes like humidity and temperature, workload, and general wear of the tape. As such, as the tape stretches and compresses, the positioning information in the servo tracks may become outdated, thus making accurate positioning of the tape head difficult.

Therefore, there is a need in the art for a tape drive capable of compensating for tape dimensional stability effects.

SUMMARY OF THE DISCLOSURE

The present disclosure is generally related to a tape drive comprising a tape head and a controller. The tape head comprises a first assembly and a second assembly disposed adjacent the first assembly, each assembly comprising a write module comprising a plurality of write heads and a read module comprising a plurality of read heads. When a tape moves in a first direction, the controller is configured to control the tape head to write data to the tape using the write module of the first module and read data from the tape using the read module of the first assembly. When the tape moves in a second direction opposite the first direction, the controller is configured to control the tape head to write data to the tape using the write module of the second module and read data from the tape using the read module of the second assembly.

In one embodiment, a tape head comprises a first assembly and a second assembly disposed adjacent to one another, each assembly comprising: a write module comprising a plurality of write heads, a read module comprising a plurality of read heads, the write module being joined together with the read module along a seam, and a via disposed along at least a portion of the seam. The first assembly and the second assembly are independently controllable to write data to a tape using the plurality of write heads of the write module and read verify the data using the plurality of read heads of the read module. The first assembly is configured to write data to and read verify the written data from the tape when the tape moves in a first direction, and the second assembly is configured to write data to and read verify the written data from the tape when the tape moves in a second direction opposite the first direction.

In another embodiment, a tape head comprises a first assembly comprising: a first write module comprising a first closure, a first plurality of write heads disposed adjacent to the first closure, and a first substrate disposed adjacent to the first plurality of write heads, a first read module comprising a second closure, a first plurality of read heads disposed adjacent to the second closure, and a second substrate disposed adjacent to the first plurality of read heads, wherein the first closure and the second closure are joined together along a first seam, and a first via disposed along a portion of the first seam. The tape head further comprises a second assembly disposed adjacent to the first assembly, the second assembly comprising: a second write module comprising a third closure, a second plurality of write heads disposed adjacent to the third closure, and a third substrate disposed adjacent to the second plurality of write heads, a second read module comprising a fourth closure, a second plurality of read heads disposed adjacent to the fourth closure, and a fourth substrate disposed adjacent to the second plurality of read heads, wherein the third closure and the fourth closure are joined together along a second seam, and a second via disposed along a portion of the second seam.

In yet another embodiment, a tape drive comprises a tape head comprising a first assembly comprising: a first write module comprising a first plurality of write heads, a first read module comprising a first plurality of read heads, wherein the first write module and the first write module are joined together along a first seam, and a first via disposed along a portion of the first seam. The tape head further comprises a second assembly disposed adjacent to the first assembly, the second assembly comprising: a second write module comprising a second plurality of write heads, a second read module comprising a second plurality of read heads, wherein the second write module and the second write module are joined together along a second seam, and a second via disposed along a portion of the second seam. The tape drive further comprises a controller configured to: control the first assembly to write data to a tape using the first plurality of write heads of the first write module and read verify the data using the first plurality of read heads of the first read module when the tape moves in a first direction; and control the second assembly to write data to the tape using the second plurality of write heads of the second write module and read verify the data using the second plurality of read heads of the second read module when the tape moves in a second direction opposite the first direction.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5B illustrate a tape head comprising two modules that are joined together without a via, according to one embodiment.

FIG. 10A illustrates the tape head shown in FIG. 9A in a tilted position, according to one embodiment.

FIG. 10B illustrates the tape head shown in FIG. 9B in a tilted position, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a tape drive comprising a tape head and a controller. The tape head comprises a first assembly and a second assembly disposed adjacent the first assembly, each assembly comprising a write module comprising a plurality of write heads and a read module comprising a plurality of read heads. When a tape moves in a first direction, the controller is configured to control the tape head to write data to the tape using the write module of the first module and read data from the tape using the read module of the first assembly. When the tape moves in a second direction opposite the first direction, the controller is configured to control the tape head to write data to the tape using the write module of the second module and read data from the tape using the read module of the second assembly.

Figure 1A:
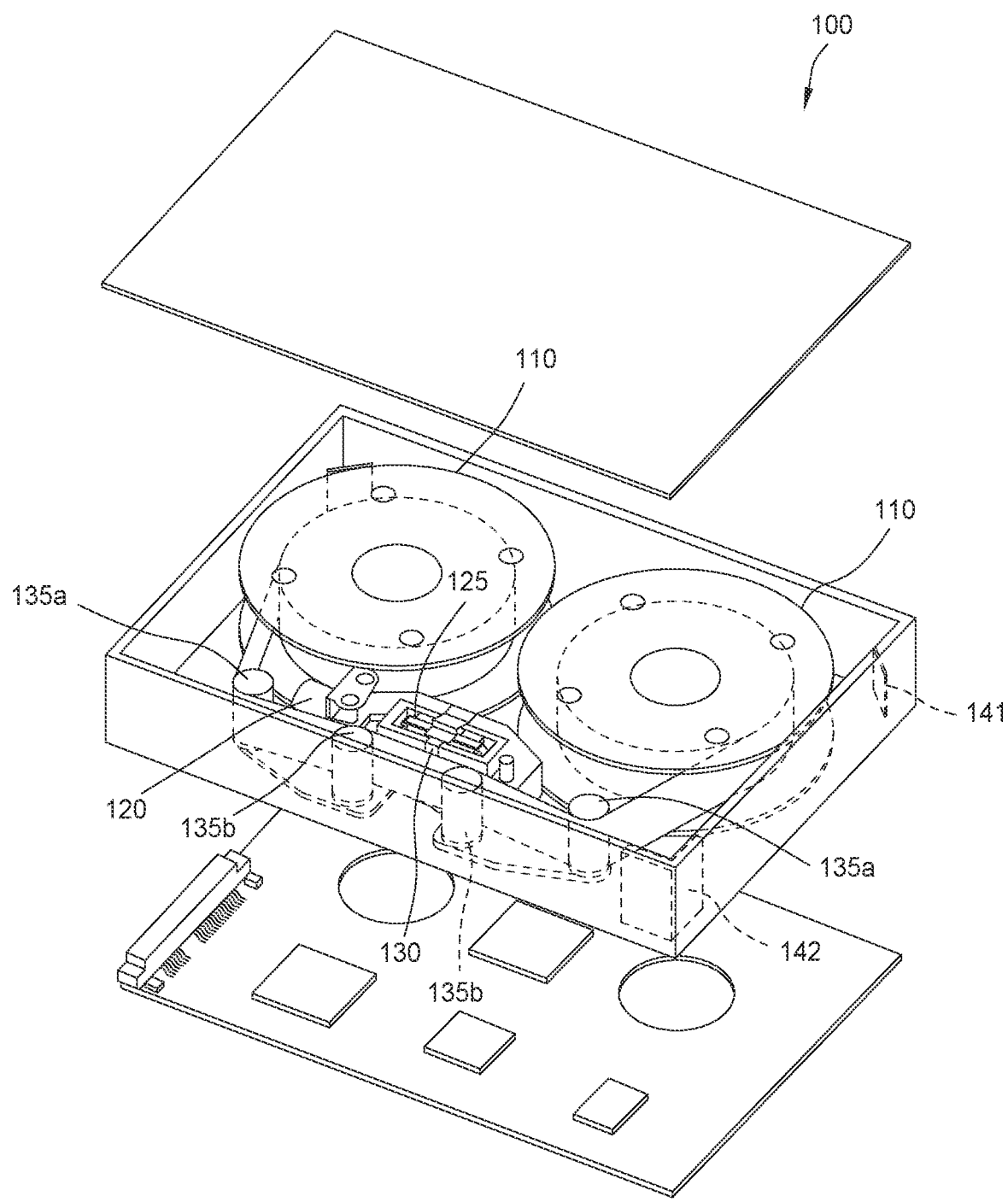
FIGS. 1A-1C illustrate a perspective exploded view, a simplified top down, and side profile view of a tape drive, in accordance with some embodiments.
Figure 1B:
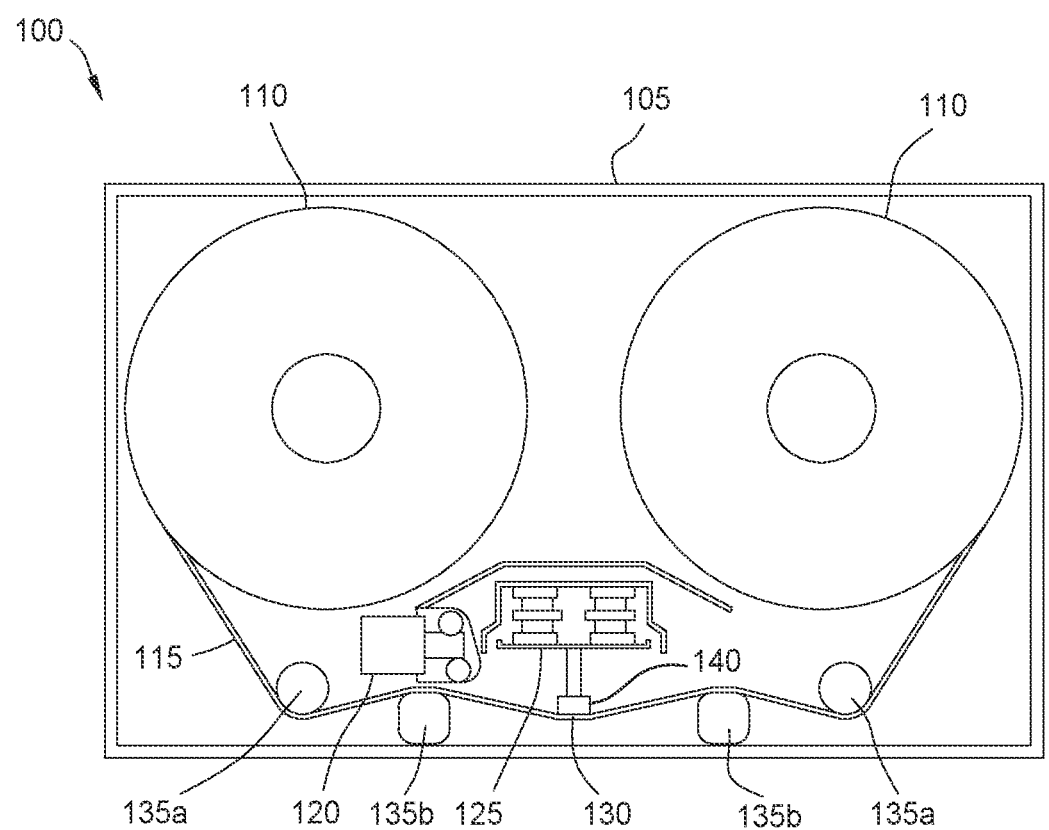
Figure 1C:
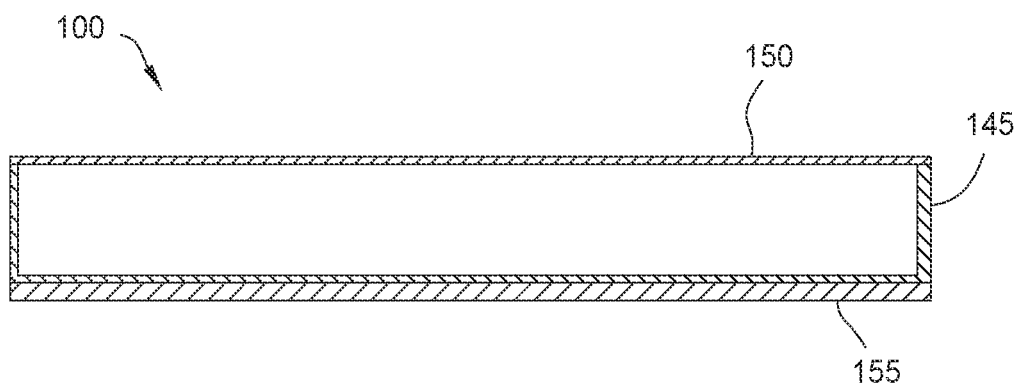

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
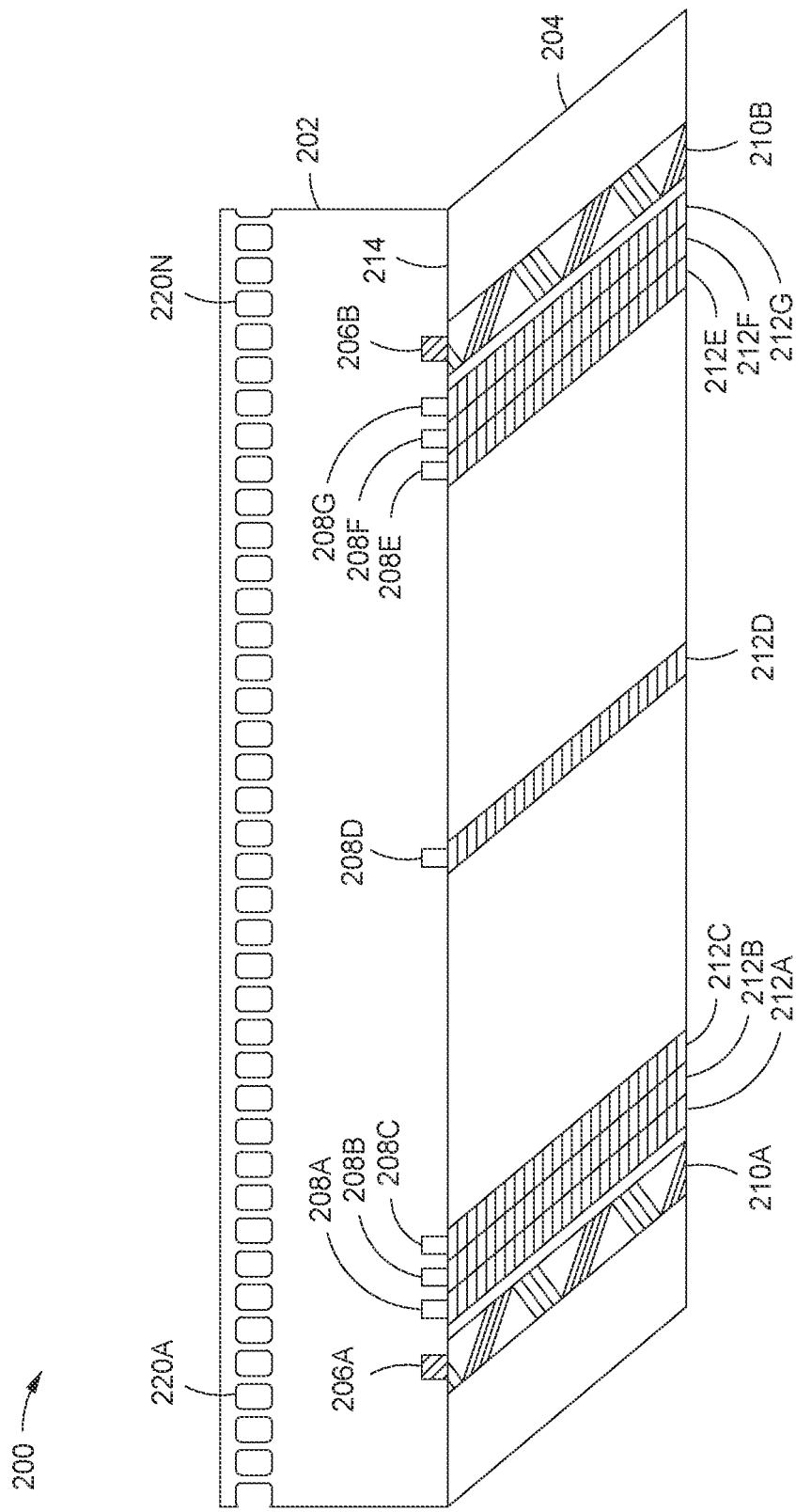
FIG. 2 is a schematic illustration of a tape head and tape that are aligned.

FIG. 2 is a schematic illustration of a portion of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller, which may be the controller 140 of FIG. 1. It is noted that FIG. 2 is an abstract schematic view of a tape head module assembly, which may include multiple modules as shown in various embodiments in the following description.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head module 200.

The tape 204 comprises a first servo track 210A and a second servo track 210B. The first servo track 210A and the second servo track 210B are spaced apart allowing the tape head module 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape head module 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3:
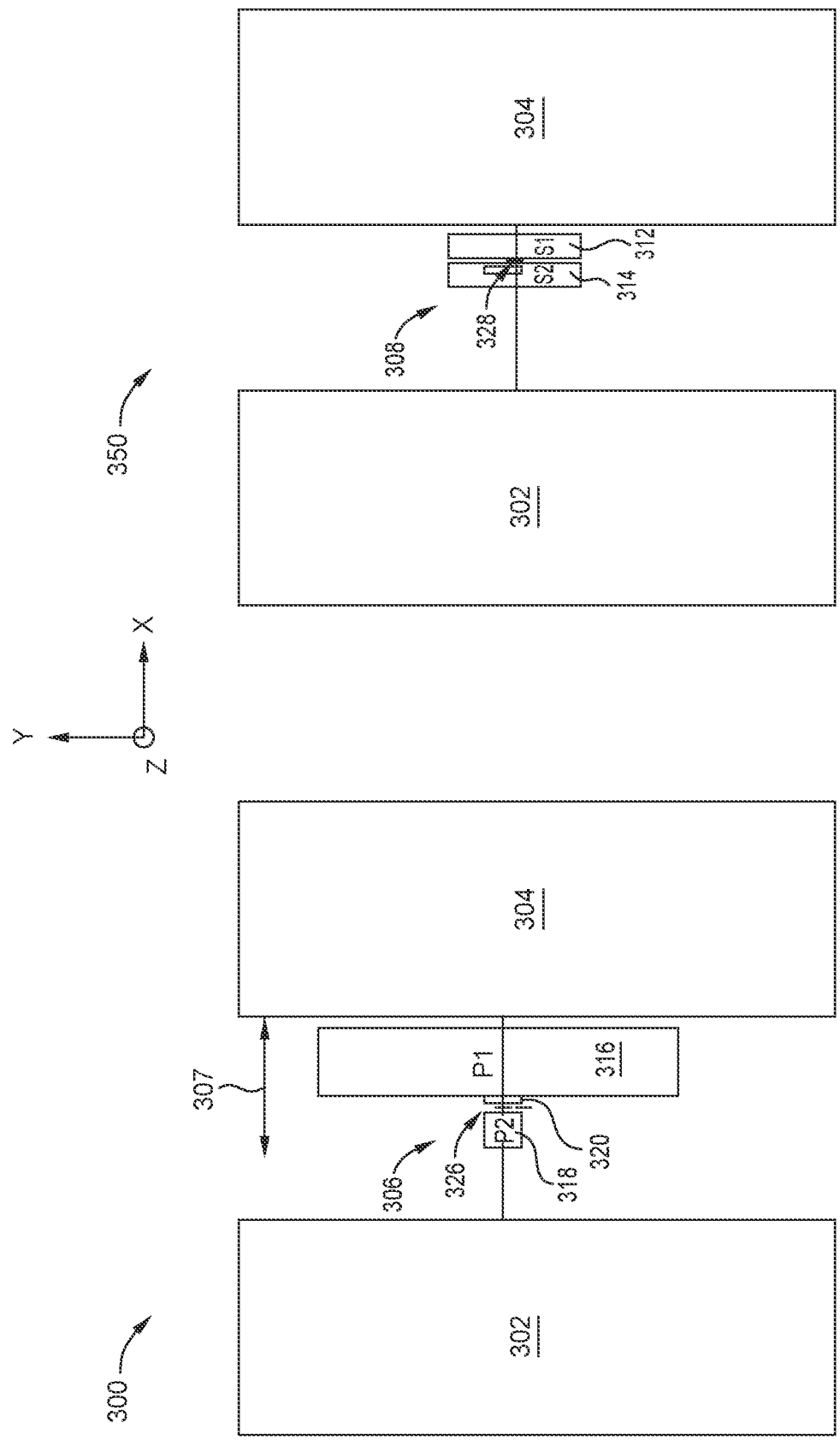
FIGS. 3A-3B illustrate a media facing surface (MFS) view of same gap verify (SGV) modules, according to various embodiments.

FIGS. 3A-3B illustrate a media facing surface (MFS) view of modules 300, 350, respectively, according to various embodiments. The modules 300, 350 may be utilized within a tape drive comprising a controller, such as the TED or tape drive 100 of FIG. 1A. The modules 300, 350 may be a part of the tape head module 200 of FIG. 2. The module 300 of FIG. 3A illustrates a write module 300, and the module 350 of FIG. 3B illustrates a read module 350.

The module 300 comprises a closure 302, one or more write transducers 306 disposed adjacent to the closure 302, and a substrate 304 disposed adjacent to the one or more write transducers 306. The module 350 comprises a closure 302, one or more read transducers 308 disposed adjacent to the closure 302, and a substrate 304 disposed adjacent to the one or more read transducers 308. Each of the one or more write transducers 306 and the one or more read transducers 308 are disposed on the substrate 304. The write transducer(s) 306 may be referred to as a writer(s) 306 or write head(s) 306, and the read transducer(s) 308 may be referred to as a reader(s) 308 or read head(s) 308.

While only one writer 306 and one reader 308 are shown in FIGS. 3A-3B, the modules 300, 350 may each individually comprise a plurality of writers 306 and readers 308, respectively, which may be referred to as a head array. For example, in some embodiments, the module 300 comprises a head array of 16 or 32 writers 306 along with one or more servo readers (not shown), and the module 350 comprises a head array of 16 or 32 readers 308 along with one or more servo readers.

In the module 300, each of the writers 306 comprises a first write pole P1 316 and a second write pole P2 318. A notch 320 may be disposed on the P1 316. The notch 320 is disposed adjacent to a write gap 326, where the P1 316 is spaced from the P2 318 by a distance in the x-direction at least twice the length of the write gap 326. In the module 350, each of the readers 308 comprises a first shield S1 312, a second shield S2 314, and a magnetic sensor 328 disposed between the S1 312 and the S2 314. The magnetic sensor 328 may be a tunnel magnetoresistance (TMR) sensor, for example.

Figure 4:
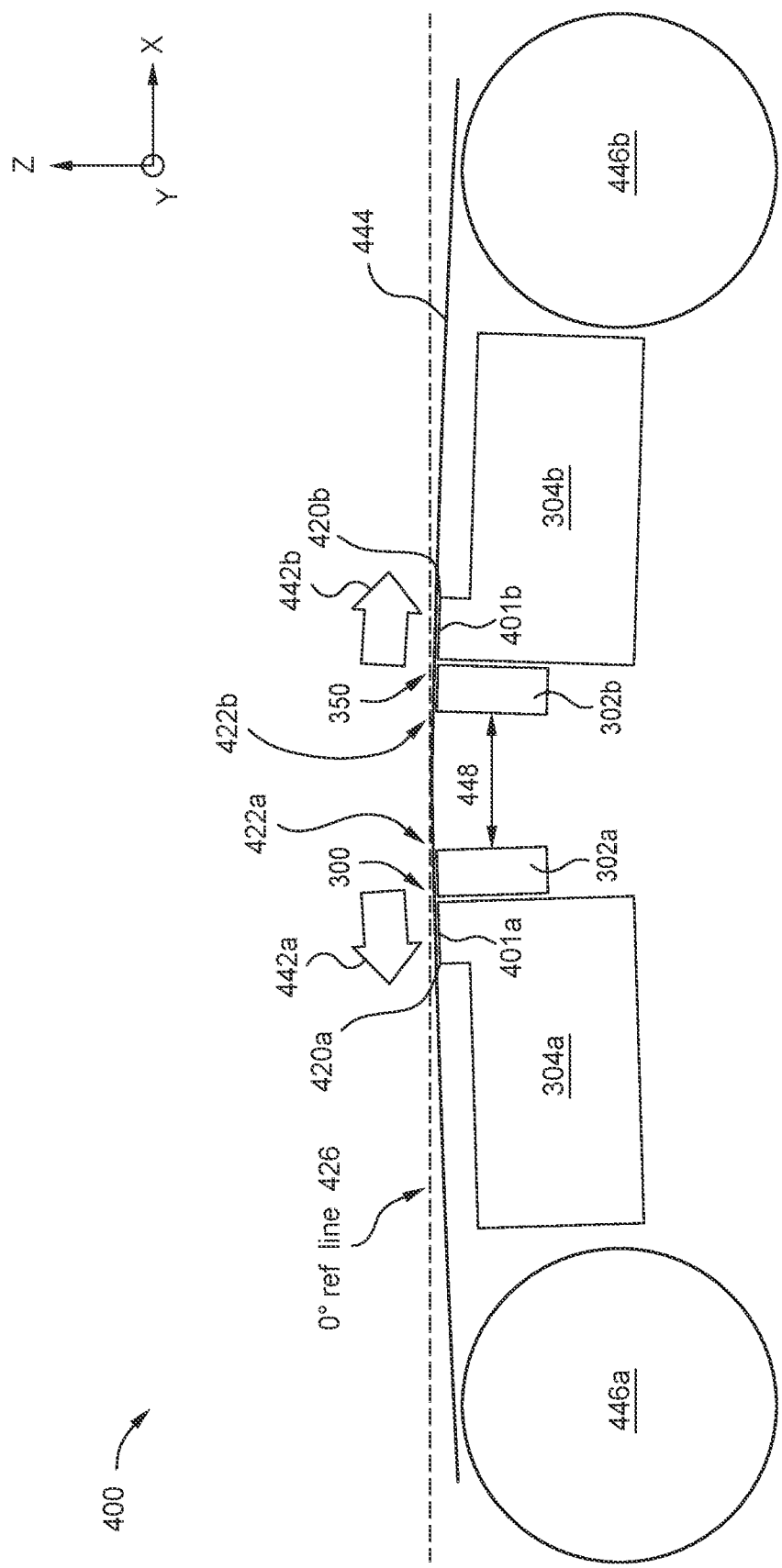
FIG. 4 illustrates a side view of a tape head comprising two SGV modules spaced apart.

FIG. 4 illustrates a side view of a tape head 400 comprising two modules 300, 350 that are spaced apart. The tape head 400 comprises a first module 300 and a second module 350. Each module 300, 350 may be the module 300 or 350 shown in FIG. 3A or FIG. 3B, respectively. The tape head 400 illustrates a tape head 400 where the tape 444 contacts both the MFS 401a of the first module 300 and the MFS 401b of the second module 350 simultaneously in both directions the tape 444 moves.

In one embodiment, the first module 300 comprises a first closure 302a, one or more first writers 306 (shown in FIG. 3A) disposed adjacent to the first closure 302a, and a first substrate 304a disposed adjacent to the one or more first writers 306. Similarly, in such an embodiment, the second module 350 comprises a second closure 302b, one or more second readers 308 (shown in FIG. 3A) disposed adjacent to the second closure 302b, and a second substrate 304b disposed adjacent to the one or more second readers 308. The first module 300 is spaced a distance 448 from the second module 350 of about 100 μm to about 1000 μm.

Referring to FIG. 4, which shows a tape head 400, a MFS 401a, 401b of each of the first and second modules 300, 350 is configured to support a tape 444 or other magnetic media. The MFS 401a, 401b of each of the first and second modules 300, 350 includes surfaces of the writers 306 and the readers 308 of the modules 300, 350. The tape 444 may contact and wrap around a first substrate corner 420a (e.g., a first skiving edge) and a first closure corner 422a (e.g., a second skiving edge) of the first module 300, and contact and wrap around a second closure corner 422b (e.g., a third skiving edge) and a second substrate corner 420b (e.g., a fourth skiving edge) of the second module 350, resulting in the tape 444 being bent or angled downwards from a 0° reference line 426 (e.g., parallel to the x-axis). In such a configuration, the tape 444 contacts both the MFS 401a and the MFS 401b simultaneously in both directions the tape 444 moves.

FIG. 5A illustrates a side view of a tape head 500 comprising two modules 300, 350 that are joined together without a via, according to one embodiment. FIG. 5B illustrates a schematic side view of the tape head 500 of FIG. 5A, according to one embodiment. The tape head 500 comprises a first module 300 and a second module 350. The first module 300 may be the module 300 shown in FIG. 3A comprising a plurality of write heads 306, and the second module 350 may be the module 350 shown in FIG. 3B comprising a plurality of read heads 308. In some embodiments, the read and write transducers 308, 306 in the first and second modules 300, 350 may be aligned, to example, to operate in a legacy mode where the first module 300 writes data and the second module 350 reads the data written by the first module 300.

In the tape head 500, the first closure 302a of the first module 300 is joined together with the second closure 302b of the second module 350. Thus, comparing to the tape head 400 of FIG. 4, the first and second modules 300, 350 are not spaced apart the distance 448 of about 100 μm to about 1000 μm. However, as shown in FIG. 5B, it can be difficult to accurately align the first and second closures 302a, 302b together such that the first MFS 401a and the second MFS 401b are aligned in the x-direction. As such, the first MFS 401a and the second MFS 401b may be offset a distance 558 in the y-direction of up to about 2 μm or more. Depending on which way a tape moves over the first and second modules 300, 350, the tape may fly over at least one of the first and/or second MFS 401a, 401b due to the offset distance 558 and air getting between the tape and the MFS 401a, 401b, which may prevent the first and/or second modules 300, 350 from writing data to or reading data from the tape.

Figure 6A:
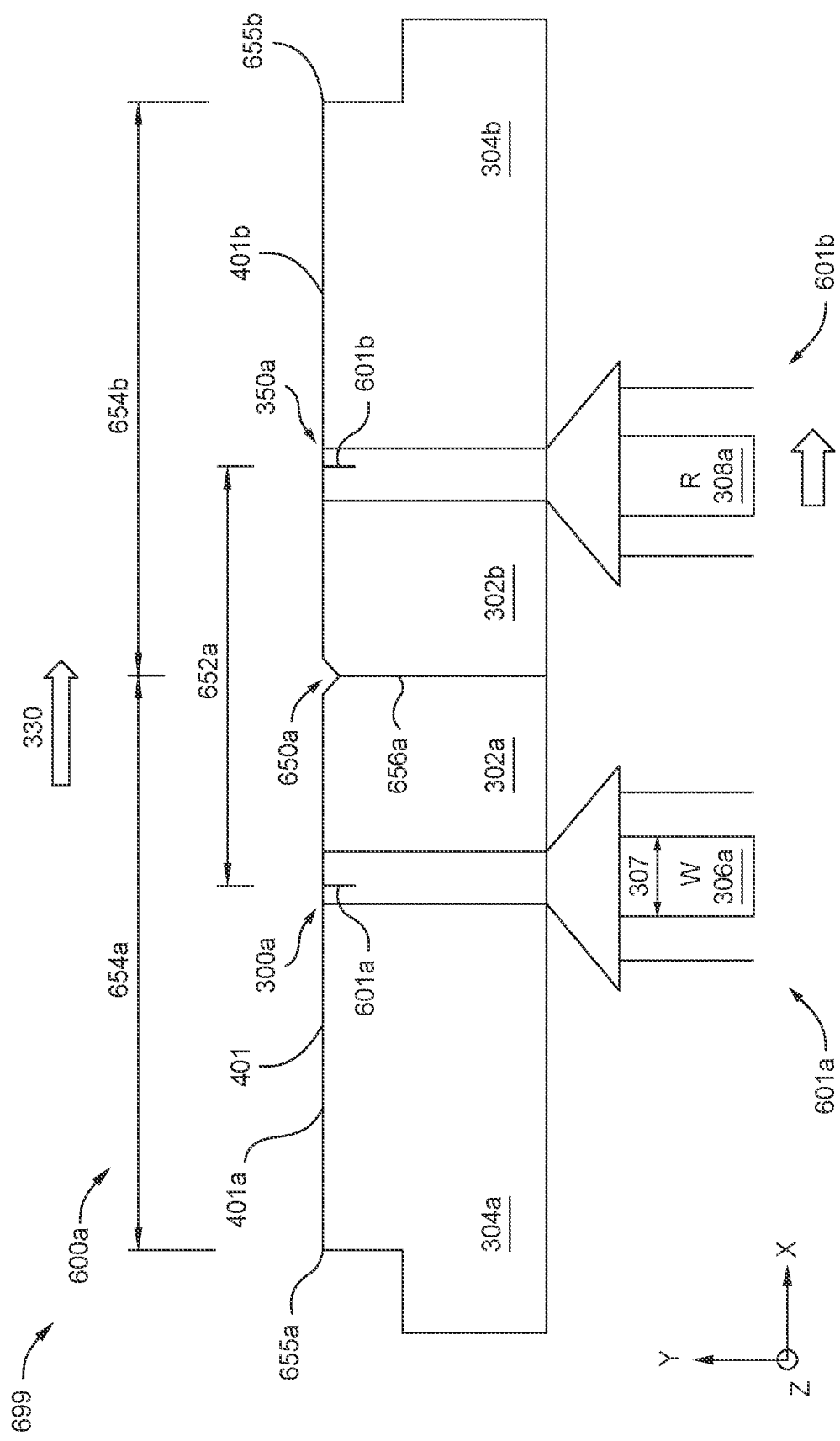
FIG. 6A illustrates a cross-sectional view of a tape head comprising a first assembly comprising two modules that are joined together with a via, according to one embodiment.
Figure 6B:
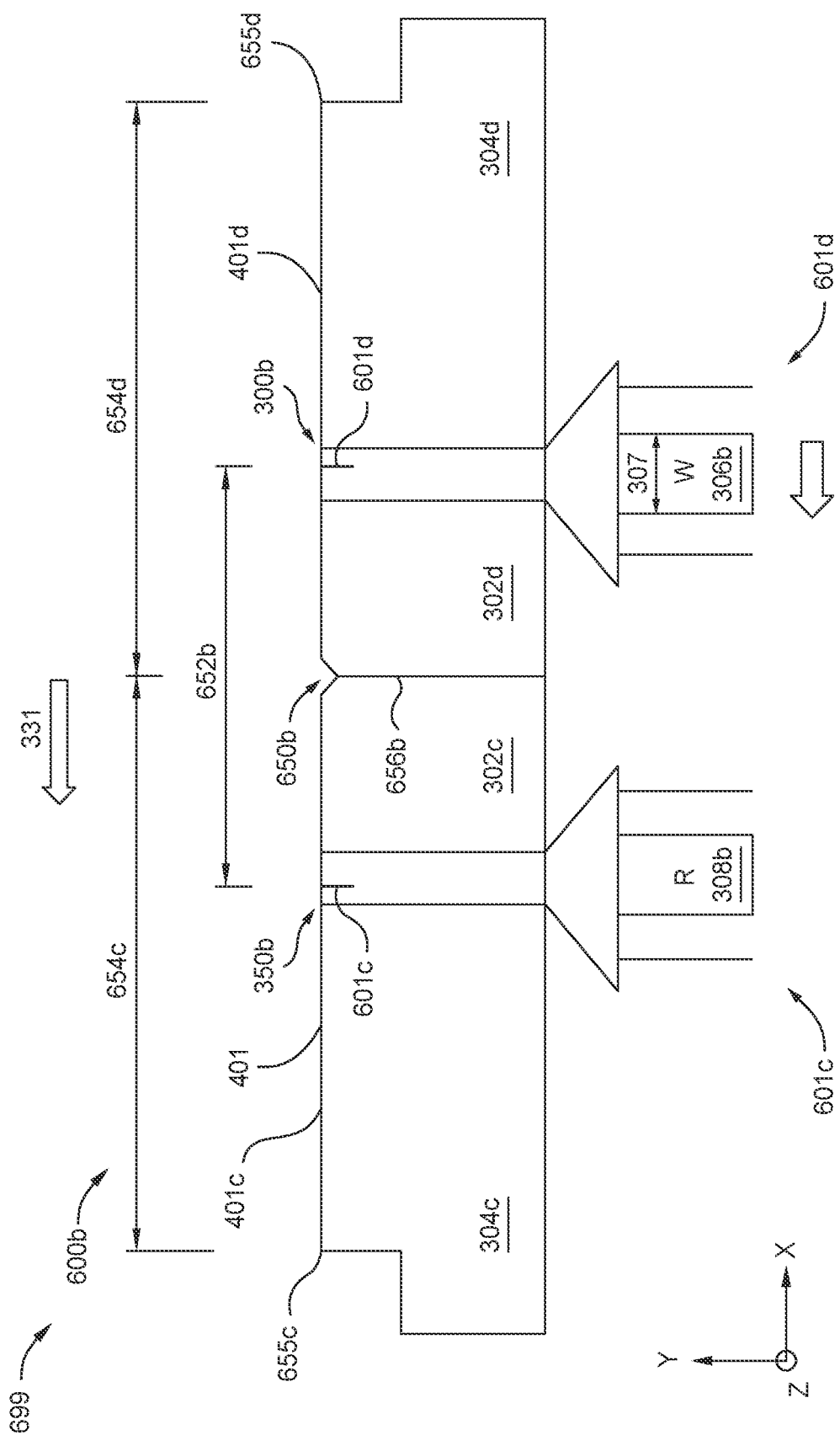
FIG. 6B illustrates a cross-sectional view of a tape head comprising a second assembly comprising two modules that are joined together with a via, according to another embodiment.
Figure 6C:
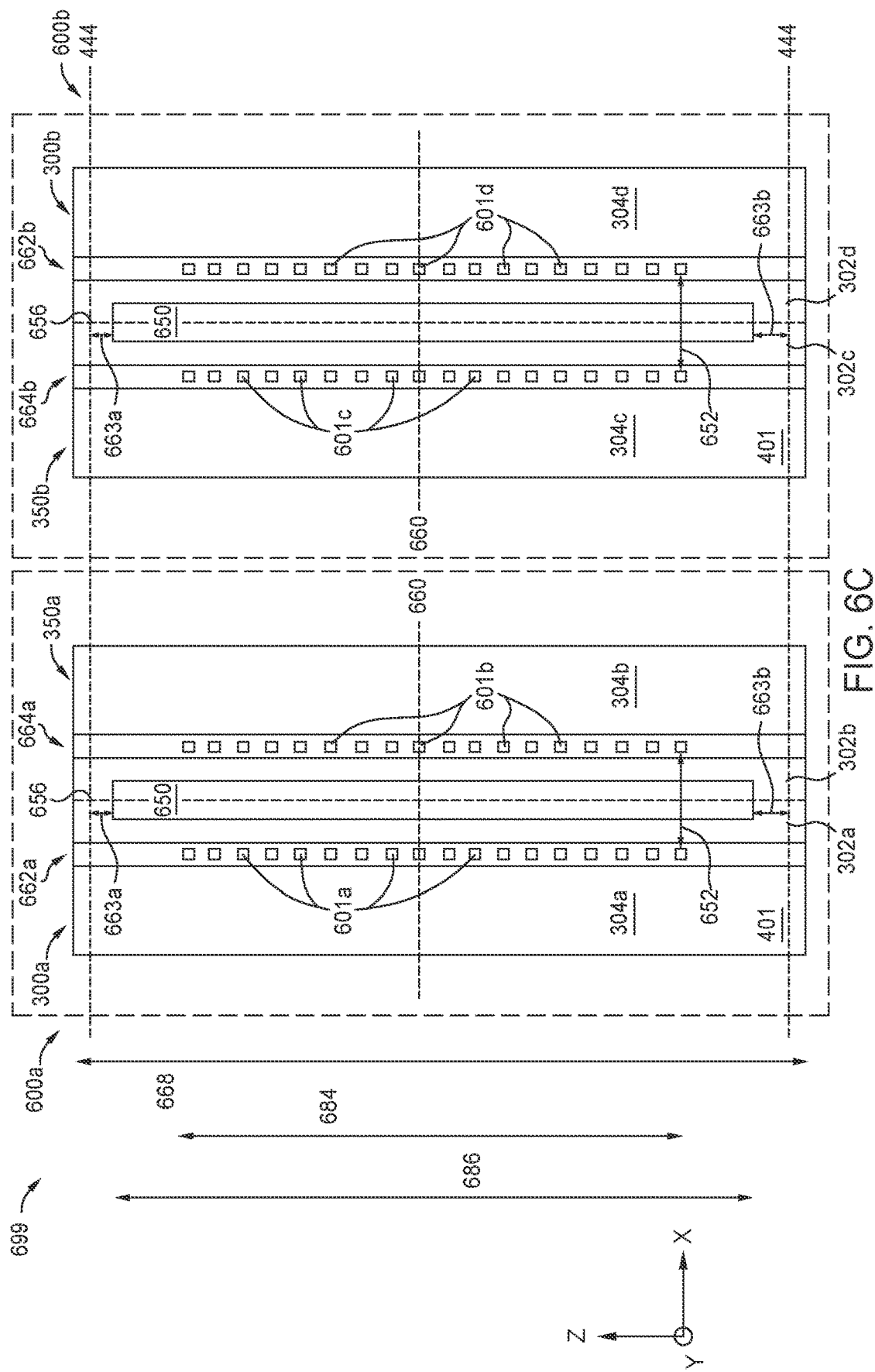
FIG. 6C illustrates an MFS view of the tape head comprising the first and second assemblies of FIGS. 6A-6B, according to one embodiment.
Figure 6D:
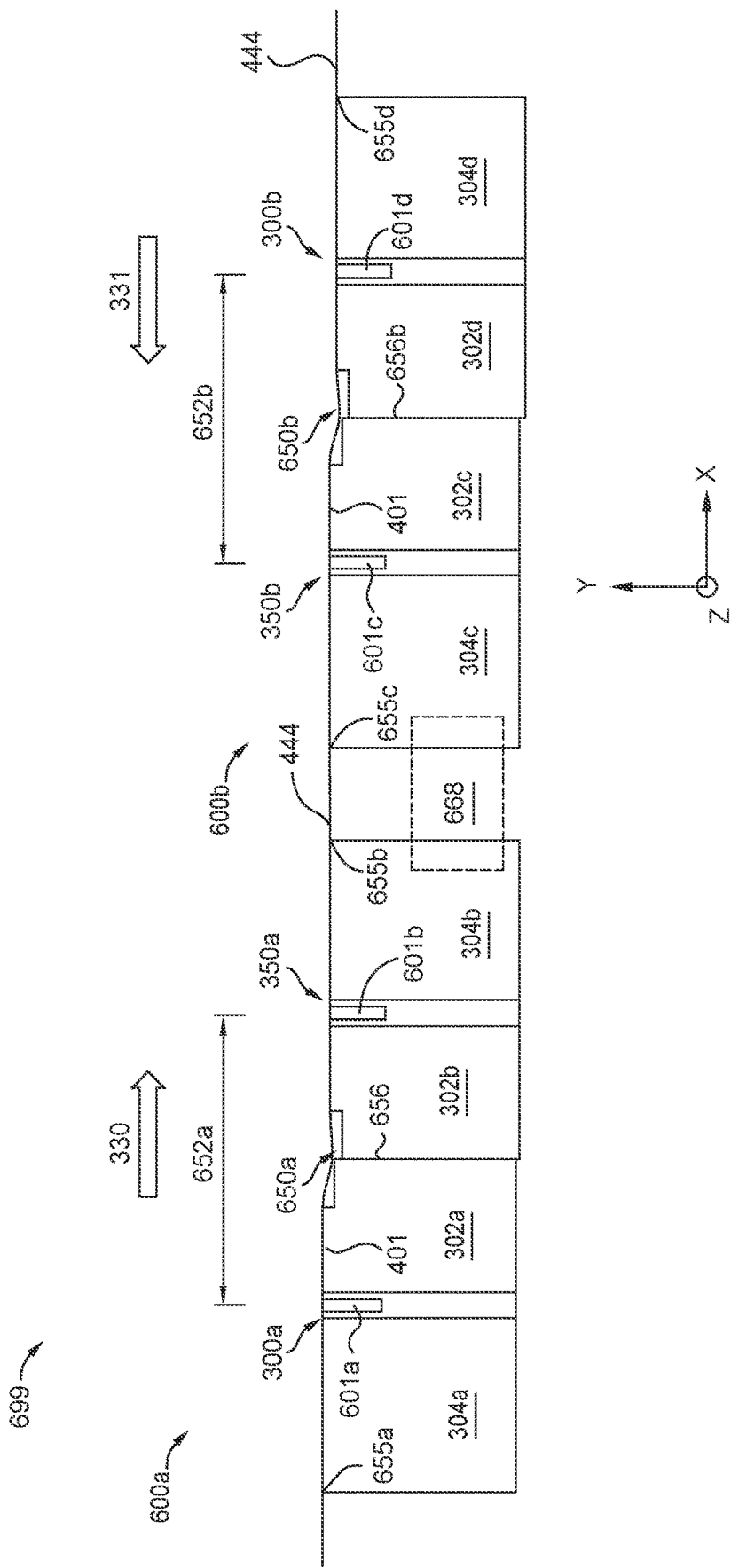
FIG. 6D illustrates a schematic cross-sectional view of the tape head comprising the first assembly of FIGS. 6A-6C, according to one embodiment.

FIG. 6A illustrates a cross-sectional view of a tape head 699 comprising a first assembly 600a comprising two modules 300a, 350a that are joined together with a via, according to one embodiment. FIG. 6B illustrates a cross-sectional view of the same tape head 699 additionally comprising a second assembly 600b comprising two modules 300b, 350b that are joined together with a via, according to another embodiment. FIG. 6C illustrates an MFS view of the tape head 699 comprising the first and second assemblies 600a, 600b of FIGS. 6A-6B, according to one embodiment. FIG. 6D illustrates a schematic cross-sectional view of the tape head 699 comprising the first assembly 600a of FIGS. 6A-6C, according to one embodiment. FIGS. 6A-6C illustrate cross-sectional views of the first and/or second assemblies 600a, 600b along the line 660 of FIG. 6B. FIGS. 7A-8B below expand upon further details regarding how the modules 300a, 350a, 300b, 350b of FIGS. 6A-6D are joined together. As such, aspects of FIGS. 6A-8B may be used in combination with one another. While not shown, the tape head 699 of FIGS. 6A-6D is controlled by a controller, such as the controller 140 of FIGS. 1A-1C.

The first assembly 600a comprises a first module 300a and a second module 350a. The first module 300a may be the module 300 shown in FIG. 3A comprising a plurality of write heads 306, and the second module 350 may be the module 350 shown in FIG. 3B comprising a plurality of read heads 308. The first module 300a may be referred to as a write module 300a and the second module 350a may be referred to as a read module 350a. In some embodiments, a shield (not shown) is disposed between the first module 300a and the second module 350a to reduce cross-talk signals to the plurality of data heads 601a from the plurality of data heads 601b. The shield may comprise permalloy and may be combined with Ir for wear resistance, for example.

The first module 300a comprises a plurality of first data heads 601a aligned in a first row 662a between a closure 302a and a substrate 304a, shown in FIG. 6C. Each first data head 601a comprises a write head 306a or a servo head. Each write head 306a of the first module 300a has a width 307 in the x-direction of about 5 µm to about 10 µm. The second module 350a comprises a plurality of second data heads 601b aligned in a second row 664a between a closure 302b and a substrate 304b, shown in FIG. 6C. Each second data head 601b comprises a read head 308a or a servo head. The first row 662a and the second row 664a are disposed parallel to one another and are aligned in the x-direction and the z-direction. In other words, the plurality of first data heads 601a are aligned in the x-direction and the z-direction with the plurality of second data heads 601b. The first and second rows 662a, 664a have a same width 684 or span length in the z-direction.

While not shown, both the first and second modules 300a, 350a may comprise one or more servo heads aligned with the first and second rows 662a, 664a of the plurality of data heads 601a, 601b. For example, the first data head 601a and a last data head 601a of the first row 662a may be servo heads, and the first data head 601b and a last data head 601b of the second row 664a may be servo heads. In some embodiments, the read and write transducers 308a, 306a, in the first and second 300a, 350a, are aligned in the x-direction.

Similarly, the second assembly 600b comprises a third module 300b and a fourth module 350b. The third module 300b may be the module 300 shown in FIG. 3A comprising a plurality of read heads 308, and the fourth module 350b may be the module 350 shown in FIG. 3B comprising a plurality of write heads 306. The fourth module 300b may be referred to as a write module 300a and the third module 350b may be referred to as a read module 350a. In some embodiments, a shield (not shown) is disposed between the third module 350b and the fourth module 300a to reduce cross-talk signals to the plurality of data heads 601c from the plurality of data heads 601d. The shield may comprise permalloy and may be combined with Ir for wear resistance, for example.

The third module 350b comprises a plurality of third data heads 601c aligned in a third row 664b between a closure 302c and a substrate 304c, shown in FIG. 6B. Each third data head 601c comprises a read head 308b or a servo head. The fourth module 350b comprises a plurality of fourth data heads 601d aligned in a fourth row 662b between a closure 302d and a substrate 304d, shown in FIG. 6C. Each fourth data head 601d comprises a write head 306b or a servo head. Each write head 306b of the fourth module 350b has a width 307 in the x-direction of about 5 µm to about 10 µm. The fourth row 662b and the third row 664b are disposed parallel to one another and are aligned in the x-direction and the z-direction. In other words, the plurality of first data heads 601a are aligned in the x-direction and the z-direction with the plurality of second data heads 601b. The third and fourth rows 662b, 664b have a same width 684 or span length in the z-direction.

While not shown, both the third and fourth modules 350b, 300b may comprise one or more servo heads aligned with the plurality of data heads 601c, 601d. For example, the first data head 601c and a last data head 601c of the third row 664b may be servo heads, and the first data head 601d and a last data head 601d of the fourth row 662b may be servo heads. In some embodiments, the read and write transducers 306b, 308b, in the third and fourth 350b, 300b, are aligned in the x-direction.

Thus, the first module 300a and the fourth module 300b comprise a plurality of write heads 306a, 306b and one or more servo heads (not shown), and the second module 350a and the third module 350b comprise a plurality of read heads 308a, 308b and one or more servo heads (not shown). While 18 first, second, third, and fourth data heads 601a, 601b, 601c, 601d are shown, both the first, second, third, and fourth modules 300a, 350a, 350b, 300b may comprise any number of data heads 601a, 601b, 601c, 601d. As such, the number of data heads 601a, 601b, 601c, 601d is not intended to be limiting. Moreover, one or more data heads 601a, 601b, 601c, 601d may comprise servo readers, such as the outer most data heads 601a, 601b, 601c, 601d in each row.

The first row 662a of first data heads 601a of the first module 300a are spaced a distance 652 of about 50 µm to about 175 µm in the x-direction from the second row 664a of second data heads 601b of the second module 350a. The third row 664b of third data heads 601c of the third module 350b are spaced a distance 652 of about 50 µm to about 175 µm in the x-direction from the fourth row 662b of second data heads 601b of the fourth module 300b. As such, the first data heads 601a and the second data heads 601b are disposed closer together than conventional tape heads, such as by a factor of about 7 or 9, and the third data heads 601c and the fourth data heads 601d are disposed closer together than conventional tape heads, such as by a factor of about 7 or 9. Because the first and second data heads 601a, 601b, and the third and fourth data heads 601c, 601d, are disposed closer together, the width 307 of the first and second write heads 306a, 306b is able to be reduced to about 5 µm to about 10 µm.

The MFS 401a of the first module 300a has a length 654a in the x-direction of about 125 µm to about 175 µm, such as about 155 µm, the MFS 401b of the second module 350a has a length 654b in the x-direction of about 125 µm to about 175 µm, such as about 155 µm, the MFS 401c of the third module 350b has a length 654b in the x-direction of about 125 µm to about 175 µm, such as about 155 µm, and the MFS 401d of the fourth module 300b has a length 654b in the x-direction of about 125 µm to about 175 µm, such as about 155 µm. The MFS 401a of the first module 300a and the MFS 401b of the second module 350a may form a substantially continuous or flat surface, and may be collectively referred to herein as the MFS 401, and the MFS 401c of the third module 350b and the MFS 401d of the fourth module 300b may form a substantially continuous or flat surface, and may be collectively referred to herein as the MFS 401. Each MFS 401a, 401b, 401c, and 401d may be substantially aligned in the x-direction and the y-direction.

In the first assembly 600a, the first closure 302a of the first module 300a is joined together with the second closure 302b of the second module 350a along a seam 656a. The first and second modules 300a, 350a may be glued, bonded, or adhered together along the seam 656a. Thus, comparing to the tape head 400 of FIG. 4, the first and second modules 300a, 350a are not spaced apart the distance 448 of about 100 µm to about 1000 µm. The MFS 401a of the first module 300a and the MFS 401b of the second module 350a may form a substantially continuous or flat surface, and may be collectively referred to herein as the MFS 401. Because the first and second modules 300a, 350a are joined along the seam 656a, the assembly 600a has only two skiving edges, a first skiving edge 655a disposed on the first substrate 304a, or the outer edge of the MFS 401a, and a second skiving edge 655b disposed on the second substrate 304b, or the outer edge of the MFS 401b. In some embodiments, the read and write transducers 308a, 306a in the first and second modules 300a, 350a may be aligned in the x-direction.

Similarly, in the second assembly 600b, the third closure 302c of the third module 350b is joined together with the fourth closure 302d of the second module 300b along a seam 656b. The third and fourth modules 350b, 300b may be glued, bonded, or adhered together along the seam 656b. Thus, comparing to the tape head 400 of FIG. 4, the third and fourth modules 350b, 300b are not spaced apart the distance 448 of about 100 µm to about 1000 µm. The MFS 401c of the third module 350b and the MFS 401d of the fourth module 300b may form a substantially continuous or flat surface, and may be collectively referred to herein as the MFS 401. Because the third and fourth modules 350b, 300b are joined along the seam 656b, the assembly 600b has only two skiving edges, a first skiving edge 655c disposed on the first substrate 304c, or the outer edge of the MFS 401c, and a second skiving edge 655d disposed on the second substrate 304d, or the outer edge of the MFS 401d. In some embodiments, the read and write transducers 308b, 306b in the third and fourth modules 350b, 300b may be aligned in the x-direction.

As shown in FIGS. 6C and 6D, the first assembly 600a and the second assembly 600b are disposed adjacent to one another and may be used in combination with one another.

As shown, the second module 350a of the first assembly 600a is disposed adjacent to the third module 350b of the second assembly 600b. In other words, the modules 350a, 350b comprising a plurality of read heads 308a, 308b are disposed adjacent to one another. In other embodiments, such as embodiments shown in FIGS. 9A and 10a, the first module 300a is disposed adjacent to the fourth module 300b. As such, the modules 300a, 300b comprising the plurality of write heads 306a, 306b are disposed adjacent to one another. The first assembly 600a and the second assembly 600b are coupled together, schematically shown by box 668, as described further below in FIGS. 9A-9B. In some embodiments, the read and write transducers 308a, 308b, 306a, 306b in the first, second, third, and fourth modules 300a, 3050a, 350b, 300b are all aligned in the x-direction.

A first via 650a is formed along a portion of the seam 656b in the first assembly 600a, and a second via 650b is formed along a portion of the seam 656b in the second assembly 600b. Details of the vias 650a, 650b are further described below in FIGS. 7A-8B. The vias 650a, 650b may be considered a channel, bevel, or chamfer. As shown in the MFS view of FIG. 6C, the vias 650a, 650b each individually have a length 686 less than a width 668 of the first, second, third, and fourth substrates 304a, 304b, 304c, 304d and/or the first, second, third, and fourth closures 302a, 302b, 302c, 302d in the z-direction, and equal to or greater than a width 684 or span length of the first, second, third, and fourth rows 662a, 664a, 664b, 662b of the first, second, third, and fourth data heads 601a, 601b, 601c, 601d in the z-direction. The length 686 of each via 650a, 650b is less than or equal to about 500 µm greater than the width 684 of the first row 662a of first data heads 601a, the second row 664a of second data heads 601b, the third row 664b of the third data heads 601c, or the fourth row 662b of the fourth data heads 601d.

The length 686 of each via 650a, 650b being less than a width 668 of the first, second, third, and fourth substrates 304a, 304b, 304c, 304d and/or the first, second, third, and fourth closures 302a, 302b, 302c, 302d in the z-direction, and being equal to or greater than a width 684 or span length of the first, second, third, and fourth rows 662a, 664a, 664b, 662b in the z-direction, create a vacuum effect to pull a magnetic media or tape 444 against the MFS 401 when the tape head 699 reads and writes data to the magnetic media or tape 444. The length 686 of each via 650a, 650b prevents air from getting between the MFS 401 and a tape 444, allowing the tape 444 to be flush with the MFS 401 of the assemblies 600a, 600b regardless of which direction the tape 444 moves over the assemblies 600a, 600b.

Furthermore, as shown in the cross-section view of FIG. 6D, even if the first and second modules 300a, 350a, or the third and fourth modules 350b, 300b, are offset a small distance in the y-direction, such as less than 5 µm, the length 686 of the via 650a or 650b is still able to create the vacuum effect and prevent air from getting between the MFS 401 and the tape 444. The via 650a or 650b widens the range of low clearance offset (e.g., in the y-direction) between the first and second modules 300a, 350a or between the third and fourth modules 350b, 300b. Thus, transversal clearance distribution remains substantially uniform across the tape 444. The via 650a or 650b introduces a large enough spacing gap between the first and second modules 300a, 350a or between the third and fourth modules 350b, 300b that the pressure is near ambient when a tape 444 moves over the first assembly 600a or over the second assembly 60b. Due to the vacuum effect created by the via 650a or 650b, the first and second modules 300a, 350a, or the third and fourth modules 350b, 300b, are able to be joined together at the seam 656a or 656b, and the width 307 of the write heads 306a or 306b may be reduced to about 5 µm to about 10 µm in the x-direction compared to conventional write heads.

When writing data to and reading data from the tape 444, the tape is spaced a first distance 663a of about 200 µm or greater from a first end (e.g., the top) of the first and second assemblies 600a, 600b, and is spaced a second distance 663b of about 200 µm or greater from a second end (e.g., the bottom) of the first and second assemblies 600a, 600b. The first and second distances 663a, 663b are illustrated for exemplary purposes, and the tape 444 may have a greater width than the width 668 of the first and second assemblies 600a, 600b. Thus, the tape 444 may extend beyond at least one end of the assemblies 600a, 600b, and the first and second distances 663a, 663b are intended only to represent a minimum distance between the tape 444 and each end of the via 650 that enables the via to create the vacuum effect. In other words, the tape 444 will not be disposed at the both the first and second distances 663a, 663b simultaneously.

As noted above, the first assembly 600a and the second assembly 600b are disposed adjacent to one another and may be used in combination with one another. The second module 350a of the first assembly 600a is disposed adjacent to the third module 350b of the second assembly 600b. In other words, the modules 350a, 350b comprising a plurality of read heads 308a, 308b are disposed adjacent to one another. However, the first and second assemblies 600a, 600b may be positioned such that the plurality of write heads 306a, 306b are disposed adjacent to one another (i.e., the first module 300a being disposed adjacent to the fourth module 300b), like shown in FIG. 9A. The first assembly 600a and the second assembly 600b are coupled together, as schematically shown by box 668, as described further below in FIGS. 9A-9B. In the assembly 600a, when writing data to a tape or other media, the tape moves over the plurality of write heads 306a in the writing direction 330 (e.g., in the x-direction). In the assembly 600b, when writing data to a tape or other media, the tape moves over the plurality of write heads 306b in the writing direction 331 (e.g., in the −x-direction).

As such, the write heads of 306a of the first module 300a are able to write data to a portion of the tape, and the read heads 308a of the second module 350a are able to read verify the newly written portion of the tape immediately. Likewise, the write heads 306b of the fourth module 300b are able to write data to a portion of the tape, and the read heads 308b of third module 350b are able to read verify the newly written portion of the tape immediately. Thus, when the first assembly 600a is writing data to and reading data from the tape 444, the tape 444 may fly over the second assembly 600b such that the tape 444 does not contact the MFS 401 of the second assembly 600b. When the second assembly 600b is writing data to and reading data from the tape 444, the tape 444 may fly over the first assembly 600a such that the tape 444 does not contact the MFS 401 of the first assembly 600a. As such, regardless of which assembly 600a, 600b is writing and/or reading data from the tape, there are only two skiving edges (e.g., 655a and 655b, or 655c and 665d) at a time. The tape head 650 having fewer skiving edges, such as only two skiving edges, prolongs the life of the tape 444, as the tape 444 receives less wear than conventional tape heads. The assemblies 600a, 600b are also better protected, receiving less wear, enabling the overall life of the tape head 699.

Furthermore, the write heads of 306a of the first module 300a of the first assembly 600a are able to write data to a portion of the tape, and the read heads 308b of the third module 350b of the second assembly 600b are able to read verify the newly written portion of the tape immediately. Similarly, the write heads 306b of the fourth module 300b of the second assembly 600b are able to write data to a portion of the tape, and the read heads 308a of second module 350a of the first assembly 600a are able to read verify the newly written portion of the tape immediately. As such, the tape head 699 is able to write data to and read verify data from a tape concurrently by utilizing both the first and second assemblies 600a, 600b. When the first assembly 600a is configured to write and read data, the second assembly 600b is configured to not write or read data. Likewise, when the second assembly 600a is configured to write and read data, the first assembly 600a is not configured to write and read data. Thus, only one assembly is actively writing and/or reading data from the tape at a time.

As used herein, the first and second assemblies 600a, 600b being able to "concurrently" write and read data refers to the fact that both the write heads 306a of the first assembly 600a and the read heads 308b of the second assembly, or the write heads 306b of the second assembly and the read heads 308a of the first assembly 600a, are concurrently turned "on" or able to operate simultaneously with respect to various data written to a tape. However, it is to be noted that the write heads 306a, 306b and the read heads 308a, 308b are not "concurrently" operating on the same data at the same time. Rather, the write heads 306a, 306b of either the first or second assembly 600a, 600b first write data, and as the tape moves over the read heads 308a, 308b of the other assembly 600a, 600b, the read heads 308a, 308b are then able to read verify the newly written data as the write heads 306a, 306b concurrently write different data to a different portion of the tape.

Furthermore, it is to be noted that a controller (not shown) is configured to operate the assemblies 600a, 600b, and as such, the controller is configured to independently operate both the write heads 306a, 306b and the read heads 308a, 308b of two different assemblies 600a, 600b. Thus, while the write heads 306a, 306b are described as writing data and the read heads 308a, 308b are described as reading the data, the controller enables the write heads 306a, 306b to write and enables the read heads 308a, 308b to read.

Figure 7A:
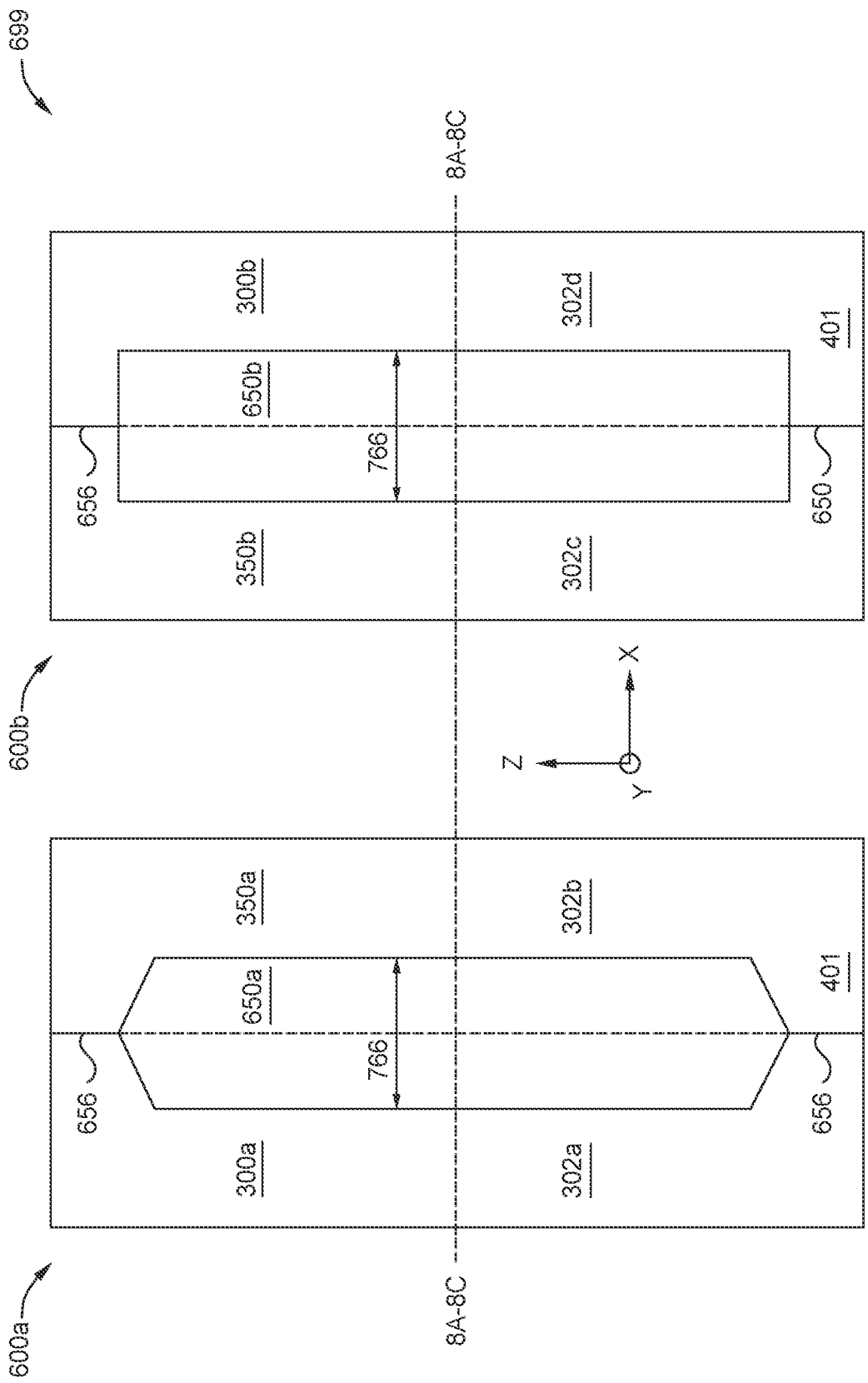
FIGS. 7A-7B illustrate MFS views of the vias of the first and second assemblies of FIGS. 6A-6D, according to various embodiments.
Figure 7B:
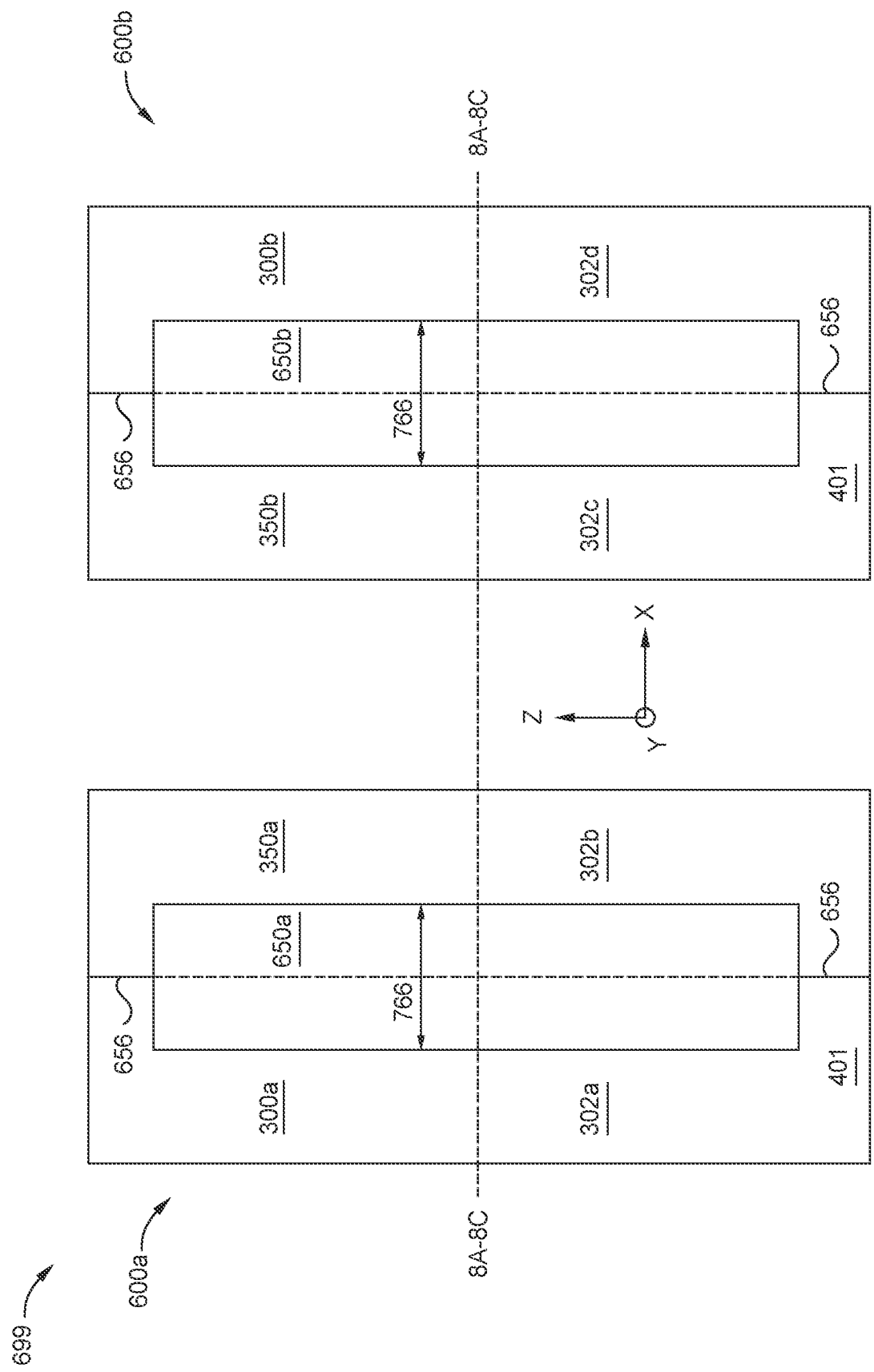

FIGS. 7A-7B illustrate MFS views of the vias 650a, 650b of the first and second assemblies 600a, 600b of FIGS. 6A-6D, according to various embodiments. In each of the embodiments shown in FIGS. 7A-7B, the vias 650a, 650b each individually have width 766 in the x-direction of about 40 µm to about 250 µm, such as about 80 µm. In FIG. 7A, the vias 650a, 650b each individually have a substantially elongated hexagonal shape, or six total sides or surfaces, when viewed from the MFS 401. In such an embodiment, the sides or surfaces of the vias 650a, 650b disposed parallel to the seam 656a, 656b are substantially straight. In FIG. 7B, the vias 650a, 650b each individually have a substantially rectangular shape when viewed from the MFS 401. While FIGS. 7A-7B illustrate two exemplary shapes that the vias 650a, 650b may be, the vias may have another shape. For example, the vias 650a, 650b may each individually have a substantially octagonal shape, or eight total sides or surfaces.

Figure 8A:
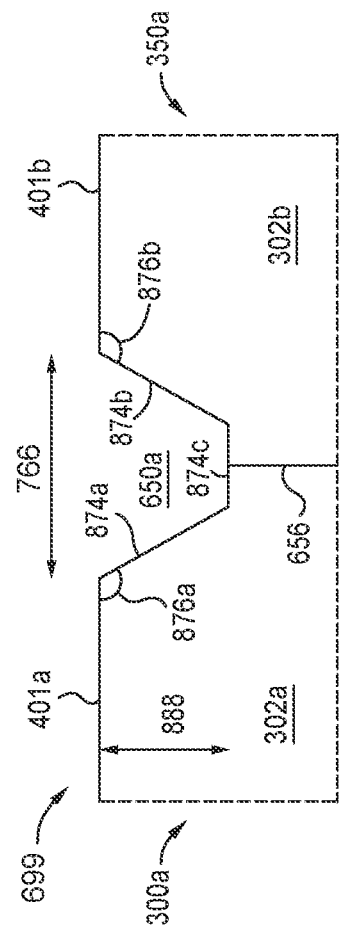
FIGS. 8A-8B illustrate cross-sectional views of the via of the first assembly of FIGS. 6A-6D, according to various embodiments.
Figure 8B:
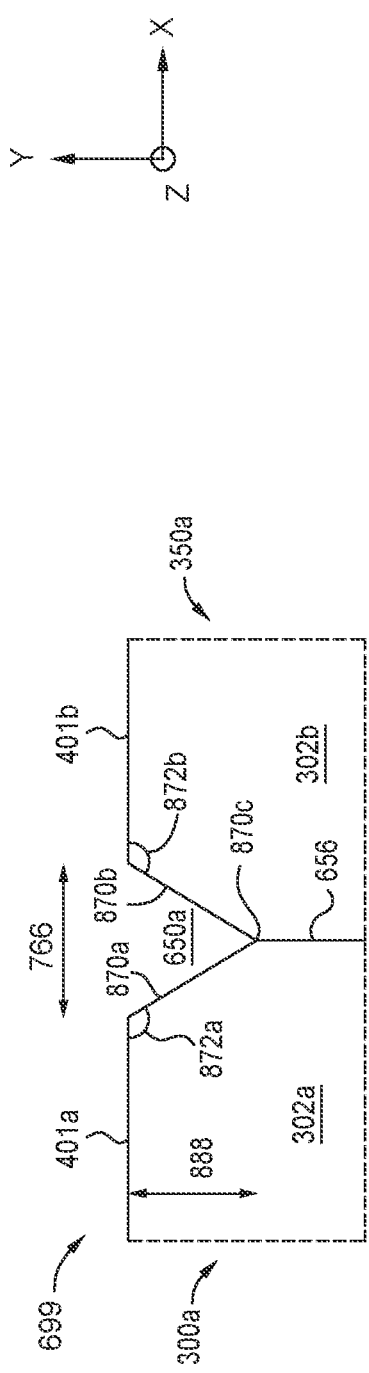

FIGS. 8A-8B illustrate cross-sectional views of the via 650a of the first assembly 600a of FIGS. 6A-6D, according to various embodiments. While only the first via 650a is shown, the second via 650b of the second assembly 600b is the same. In some embodiments, the first via 650a and the second via 650b are substantially identical, but may be mirror images of one another. In each of the embodiments shown in FIGS. 8A-8B, the vias 650a, 650b each individually have a depth 888 in the y-direction of about 0.2 μm to about 5.0 μm, such as about 0.5 μm.

In the embodiment shown in FIG. 8A, the via 650a comprises a first surface 870a extending from the MFS 401a or first closure 302a of the first module 300a to a lowest point 870c of the via 650a, and a second surface 870b extending from the MFS 401b or second closure 302b of the second module 300b to the lowest point 870c of the via 650a. The lowest point 870c is the location where the first surface 870a meets the second surface 870b. The first surface 870a is disposed at a first angle 872a with respect to the MFS 401a, and the second surface 870b is disposed at a second angle 872b with respect to the MFS 401b. The first angle 872a and the second angle 872b may each individually be between about 30 degrees to about 85 degrees. In some embodiments, the first angle 872a and the second angle 872b are the same.

In the embodiment shown in FIG. 8B, the via 650a comprises a first surface 874a extending from the MFS 401a or first closure 302a of the first module 300a to a lowest surface 874c of the via 650a, and a second surface 874b extending from the MFS 401b or second closure 302b of the second module 300b to the lowest surface 874c of the via 650a. The lowest surface 874c of the via 650a is the bottom of the via 650a, and may be substantially parallel to each MFS 401a, 401b. The first surface 874a is disposed at a first angle 876a with respect to the MFS 401a, and the second surface 874b is disposed at a second angle 876b with respect to the MFS 401b. The first angle 876a and the second angle 876b may each individually be between about 90 degrees to about 175 degrees. In some embodiments, the first angle 876a and the second angle 876b are the same.

Figure 9A:
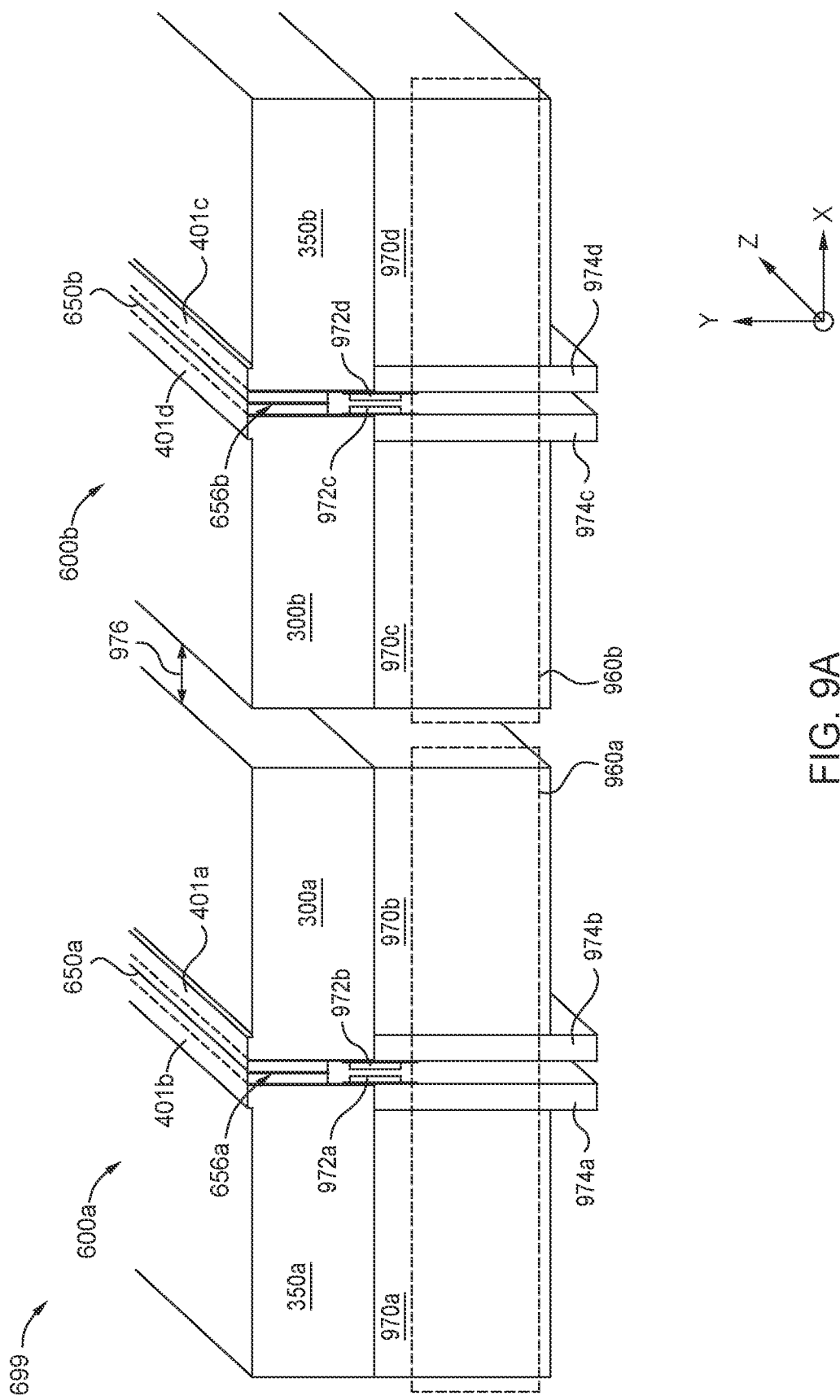
FIG. 9A illustrates the tape head of FIGS. 6A-6D having the first and second assemblies arranged in a manner where the write module of the first assembly is disposed adjacent to the write module or the second assembly, according to one embodiment.

FIGS. 9A-10B illustrate perspective end views of the tape head 699 of FIGS. 6A-6D, according to various embodiments. FIG. 9A illustrates the tape head 699 having the first and second assemblies 600a, 600b arranged in a manner where the first module 300a is disposed adjacent to the fourth module 300b. FIG. 9B illustrates the tape head 699 arranged in a manner where the second module 350a is disposed adjacent to the third module 350b. FIG. 10A corresponds to the tape head 699 shown in FIG. 9A and FIG. 10B corresponds to the tape head 699 shown in FIG. 9B.

In the tape head 699 of FIG. 9A, the second module 350a is disposed on and coupled to a first chip beam 970a by a first bond pad 972a, the first module 300a is disposed on and coupled to a second chip beam 970 by a second bond pad 972b, the fourth module 300b is disposed on and coupled to a third chip beam 970c by a third bond pad 972c, and the third module 350b is disposed on and coupled to a fourth chip beam 970d by a fourth bond pad 972d. First wiring or leads 974a are coupled to the second data heads 601b by the first bond pad 972a, second wiring or leads 974b are coupled to the first data heads 601a by the second bond pad 972b, third wiring or leads 974c are coupled to the fourth data heads 601d by the third bond pad 972c, and fourth wiring or leads 974d are coupled to the third data heads 601c by the fourth bond pad 972d.

In FIG. 9A, one or more first end caps 960a are disposed on the outer ends of the first and second chip beams 970a-970b to couple the first module 300a to the second module 350a. Similarly, one or more second end caps 960b are disposed on the outer ends of the third and fourth chip beams 970c-970d to couple the fourth module 300b to the third module 350b. The first assembly 600a may be spaced from the second assembly 600b a distance 976 in the x-direction of about 50 μm to about 1000 μm.

Figure 9B:
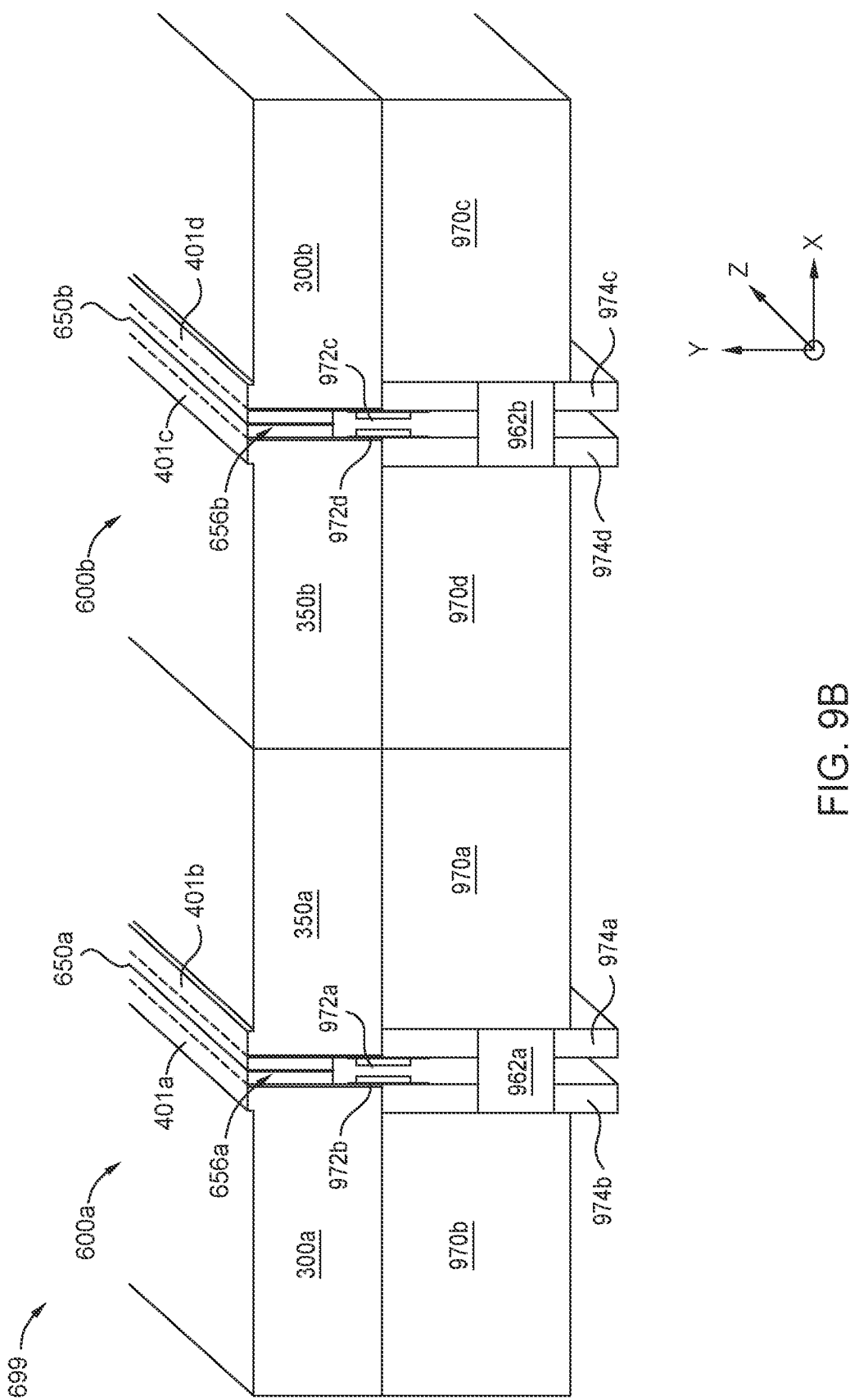
FIG. 9B illustrates the tape head of FIGS. 6A-6D having the first and second assemblies arranged in a manner where the read module of the first assembly is disposed adjacent to the read module or the second assembly, according to another embodiment.

In FIG. 9B, one or more first posts 962a are disposed on the outer ends of the first and second chip beams 970a-970b to couple the first module 300a to the second module 350a. Similarly, one or more second posts 962b are disposed on the outer ends of the third and fourth chip beams 970c-970d to couple the fourth module 300b to the third module 350b. The first assembly 600a may be disposed in contact with the second assembly 600b. For example, the second module 350a may be disposed in contact with the third module 350b, or the first module 300a may be disposed in contact with the fourth module 300b.

FIGS. 9A and 9B may be used in combination with one another. For example, when one or more posts are used to join the first and second modules 300a, 350a, or to join the third and fourth modules 350b, 300b, the first assembly 600a and the second assembly 600b may be positioned in contact with one another.

FIG. 10A corresponds to the tape head 699 shown in FIG. 9A and FIG. 10B corresponds to the tape head 699 shown in FIG. 9B. As shown in FIG. 10A, when the first write module 300a is disposed adjacent to the fourth write module 300b, the first assembly 600a may be tilted about 0 degrees to about 15 degrees in the −x-direction, such as about 1 degree to about 15 degrees, away from the second assembly 600b, which may be tilted about 0 degrees to about 15 degrees in the x-direction, such as about 1 degree to about 15 degrees. In other words, an upper inner corner 1082a of the first assembly 600a is spaced further from the upper inner corner 1084a of the second assembly 600b as compared to a lower inner corner 1082b of the first assembly 600a being disposed closer to the lower inner corner 1084b of the second assembly 600b. Tilting the first and second assemblies 600a, 600b away from one another allows the tape to fly over the assembly 600a, 600b that is not currently in use writing or reading data from the tape, as discussed above.

As shown in FIG. 10B, when the second read module 350a is disposed adjacent to the third read module 350b, the first assembly 600a may be tilted about 0 degrees to about 15 degrees in the x-direction, such as about 1 degree to about 15 degrees, towards the second assembly 600b, which may be tilted about 0 degrees to about 15 degrees in the −x-direction, such as about 1 degree to about 15 degrees. In other words, the upper inner corner 1082a of the first assembly 600a is disposed closer to the upper inner corner 1084a of the second assembly 600b as compared to the lower inner corner 1082b of the first assembly 600a being spaced further from the lower inner corner 1084b of the second assembly 600b. Tilting the first and second assemblies 600a, 600b towards one another allows the tape to fly over the assembly 600a, 600b that is not currently in use writing or reading data from the tape, as discussed above.

Therefore, by utilizing two assemblies in a tape head, each assembly comprising a write module and a read module joined together along a seam, where a via is disposed along the seam, each assembly is capable of concurrently writing data to a tape using the write module and reading the data from the tape using the read module. Moreover, by including the via along the seam where the write module and read module are joined together, a vacuum effect is created to pull a magnetic media or tape against the MFS of the tape head when the tape head reads and writes data to the magnetic media or tape. By tilting each of the assemblies, the tape may fly over an assembly not currently in use, which reduces the number of skiving edges of the tape head and prolongs the life of the tape, as the tape receives less wear than conventional tape heads. The modules of the assemblies are also better protected, receiving less wear, enabling the overall life of the tape head.

In one embodiment, a tape head comprises a first assembly and a second assembly disposed adjacent to one another, each assembly comprising: a write module comprising a plurality of write heads, a read module comprising a plurality of read heads, the write module being joined together with the read module along a seam, and a via disposed along at least a portion of the seam. The first assembly and the second assembly are independently controllable to write data to a tape using the plurality of write heads of the write module and read verify the data using the plurality of read heads of the read module. The first assembly is configured to write data to and read verify the written data from the tape when the tape moves in a first direction, and the second assembly is configured to write data to and read verify the written data from the tape when the tape moves in a second direction opposite the first direction.

When the tape moves in the first direction, the tape contacts a MFS of the first assembly and is spaced from the MFS of the second assembly, and when the tape moves in the second direction, the tape contacts the MFS of the second assembly and is spaced from the MFS of the first assembly. The write module and the read module of each of the first assembly and the second assembly are joined together using one or more posts. The write module and the read module of each of the first assembly and the second assembly are joined together using one or more end caps. The first assembly and the second assembly are each individually tilted about 0 degrees to about 15 degrees. The via of each assembly has a depth of about 0.2 µm to about 5.0 µm and a width of about 40 µm to about 250 µm. The via of each assembly is configured to create a vacuum effect to pull the tape against a media facing surface when the tape head reads and writes data to the tape. A tape drive comprises the tape head.

In another embodiment, a tape head comprises a first assembly comprising: a first write module comprising a first closure, a first plurality of write heads disposed adjacent to the first closure, and a first substrate disposed adjacent to the first plurality of write heads, a first read module comprising a second closure, a first plurality of read heads disposed adjacent to the second closure, and a second substrate disposed adjacent to the first plurality of read heads, wherein the first closure and the second closure are joined together along a first seam, and a first via disposed along a portion of the first seam. The tape head further comprises a second assembly disposed adjacent to the first assembly, the second assembly comprising: a second write module comprising a third closure, a second plurality of write heads disposed adjacent to the third closure, and a third substrate disposed adjacent to the second plurality of write heads, a second read module comprising a fourth closure, a second plurality of read heads disposed adjacent to the fourth closure, and a fourth substrate disposed adjacent to the second plurality of read heads, wherein the third closure and the fourth closure are joined together along a second seam, and a second via disposed along a portion of the second seam.

The first assembly is controllable to write data to a tape using the first plurality of write heads of the first write module and read verify the data using the first plurality of read heads of the first read module. The second assembly is controllable to write data to the tape using the second plurality of write heads of the second write module and read verify the data using the second plurality of read heads of the second read module. The first assembly writes data to and reads data from the tape when the tape moves in a first direction, and the second assembly writes data to and reads data from the tape when the tape moves in a second direction opposite the first direction. The first read module of the first assembly is disposed adjacent to the second read module of the second assembly, wherein the first assembly is tilted about 0 degrees to about 15 degrees in a first direction towards the second assembly, and wherein the second assembly is tilted about 0 degrees to about 15 degrees in a second direction opposite the first direction towards the first assembly. The first write module of the first assembly is disposed adjacent to the second write module of the second assembly, wherein the first assembly is tilted about 0 degrees to about 15 degrees in a first direction away from the second assembly, and wherein the second assembly is tilted about 0 degrees to about 15 degrees in a second direction opposite the first direction away from the first assembly. The first plurality of write heads is disposed in a first row at a media facing surface (MFS), the first plurality of read heads is disposed in a second row at the MFS, the second plurality of write heads is disposed in a third row at the MFS, and the second plurality of read heads is disposed in a fourth row at the MFS. The first, second, third, and fourth rows are substantially aligned with one another at the MFS, wherein the first via has a first length greater than or equal to a length of the first row and less than a length of the first seam, and wherein the second via has a second length greater than or equal to a length of the fourth row and less than a length of the second seam. A tape drive comprises the tape head.

In yet another embodiment, a tape drive comprises a tape head comprising a first assembly comprising: a first write module comprising a first plurality of write heads, a first read module comprising a first plurality of read heads, wherein the first write module and the first write module are joined together along a first seam, and a first via disposed along a portion of the first seam. The tape head further comprises a second assembly disposed adjacent to the first assembly, the second assembly comprising: a second write module comprising a second plurality of write heads, a second read module comprising a second plurality of read heads, wherein the second write module and the second write module are joined together along a second seam, and a second via disposed along a portion of the second seam. The tape drive further comprises a controller configured to: control the first assembly to write data to a tape using the first plurality of write heads of the first write module and read verify the data using the first plurality of read heads of the first read module when the tape moves in a first direction; and control the second assembly to write data to the tape using the second plurality of write heads of the second write module and read verify the data using the second plurality of read heads of the second read module when the tape moves in a second direction opposite the first direction.

When the tape moves in the first direction, the tape contacts a media facing surface (MFS) of the first assembly and is spaced from the MFS of the second assembly, and when the tape moves in the second direction, the tape contacts the MFS of the second assembly and is spaced from the MFS of the first assembly. The first read module of the first assembly is disposed adjacent to the second read module of the second assembly. The first assembly is tilted about 0 degrees to about 15 degrees in a first direction towards the second assembly, and wherein the second assembly is tilted about 0 degrees to about 15 degrees in a second direction opposite the first direction towards the first assembly. The first write module of the first assembly is disposed adjacent to the second write module of the second assembly. The first assembly is tilted about 0 degrees to about 15 degrees in a first direction away from the second assembly, and wherein the second assembly is tilted about 0 degrees to about 15 degrees in a second direction opposite the first direction away from the first assembly.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
a first assembly and a second assembly disposed adjacent to one another, each assembly comprising:
a write module comprising a plurality of write heads;
a read module comprising a plurality of read heads, the write module being joined together with the read module along a seam; and
a via disposed along at least a portion of the seam, wherein:
the first assembly and the second assembly are independently controllable to write data to a tape using the plurality of write heads of the write module and read verify the data using the plurality of read heads of the read module,
the first assembly is configured to write data to and read verify the written data from the tape when the tape moves in a first direction, and
the second assembly is configured to write data to and read verify the written data from the tape when the tape moves in a second direction opposite the first direction.

2. The tape head of claim 1, wherein when the tape moves in the first direction, the tape contacts a media facing surface (MFS) of the first assembly and is spaced from the MFS of the second assembly, and when the tape moves in the second direction, the tape contacts the MFS of the second assembly and is spaced from the MFS of the first assembly.

3. The tape head of claim 1, wherein the write module and the read module of each of the first assembly and the second assembly are joined together using one or more posts.

4. The tape head of claim 1, wherein the write module and the read module of each of the first assembly and the second assembly are joined together using one or more end caps.

5. The tape head of claim 1, wherein the first assembly and the second assembly are each individually tilted about 0 degrees to about 15 degrees.

6. The tape head of claim 1, wherein the via of each assembly has a depth of about 0.2 µm to about 5.0 µm and a width of about 40 µm to about 250 µm, and wherein the via of each assembly is configured to create a vacuum effect to pull the tape against a media facing surface when the tape head reads and writes data to the tape.

7. A tape drive comprising the tape head of claim 1.

8. A tape head, comprising:
a first assembly comprising:
a first write module comprising a first closure, a first plurality of write heads disposed adjacent to the first closure, and a first substrate disposed adjacent to the first plurality of write heads;
a first read module comprising a second closure, a first plurality of read heads disposed adjacent to the second closure, and a second substrate disposed adjacent to the first plurality of read heads, wherein the first closure and the second closure are joined together along a first seam; and
a first via disposed along a portion of the first seam;

a second assembly disposed adjacent to the first assembly, the second assembly comprising:
a second write module comprising a third closure, a second plurality of write heads disposed adjacent to the third closure, and a third substrate disposed adjacent to the second plurality of write heads;
a second read module comprising a fourth closure, a second plurality of read heads disposed adjacent to the fourth closure, and a fourth substrate disposed adjacent to the second plurality of read heads, wherein the third closure and the fourth closure are joined together along a second seam; and
a second via disposed along a portion of the second seam.

9. The tape head of claim 8, wherein the first assembly is controllable to write data to a tape using the first plurality of write heads of the first write module and read verify the data using the first plurality of read heads of the first read module, and wherein the second assembly is controllable to write data to the tape using the second plurality of write heads of the second write module and read verify the data using the second plurality of read heads of the second read module.

10. The tape head of claim 9, wherein the first assembly writes data to and reads data from the tape when the tape moves in a first direction, and the second assembly writes data to and reads data from the tape when the tape moves in a second direction opposite the first direction.

11. The tape head of claim 8, wherein the first read module of the first assembly is disposed adjacent to the second read module of the second assembly, wherein the first assembly is tilted about 0 degrees to about 15 degrees in a first direction towards the second assembly, and wherein the second assembly is tilted about 0 degrees to about 15 degrees in a second direction opposite the first direction towards the first assembly.

12. The tape head of claim 8, wherein the first write module of the first assembly is disposed adjacent to the second write module of the second assembly, wherein the first assembly is tilted about 0 degrees to about 15 degrees in a first direction away from the second assembly, and wherein the second assembly is tilted about 0 degrees to about 15 degrees in a second direction opposite the first direction away from the first assembly.

13. The tape head of claim 8, wherein the first plurality of write heads is disposed in a first row at a media facing surface (MFS), the first plurality of read heads is disposed in a second row at the MFS, the second plurality of write heads is disposed in a third row at the MFS, and the second plurality of read heads is disposed in a fourth row at the MFS.

14. The tape head of claim 13, wherein the first, second, third, and fourth rows are substantially aligned with one another at the MFS, wherein the first via has a first length greater than or equal to a length of the first row and less than a length of the first seam, and wherein the second via has a second length greater than or equal to a length of the fourth row and less than a length of the second seam.

15. A tape drive comprising the tape head of claim 8.

16. A tape drive, comprising:
a tape head comprising:
a first assembly comprising:
a first write module comprising a first plurality of write heads;
a first read module comprising a first plurality of read heads, wherein the first write module and the first write module are joined together along a first seam; and a first via disposed along a portion of the first seam;
a second assembly disposed adjacent to the first assembly, the second assembly comprising:
  a second write module comprising a second plurality of write heads;
  a second read module comprising a second plurality of read heads, wherein the second write module and the second write module are joined together along a second seam; and
  a second via disposed along a portion of the second seam;
a controller configured to:
  control the first assembly to write data to a tape using the first plurality of write heads of the first write module and read verify the data using the first plurality of read heads of the first read module when the tape moves in a first direction; and
  control the second assembly to write data to the tape using the second plurality of write heads of the second write module and read verify the data using the second plurality of read heads of the second read module when the tape moves in a second direction opposite the first direction.

17. The tape drive of claim 16, wherein when the tape moves in the first direction, the tape contacts a media facing surface (MFS) of the first assembly and is spaced from the MFS of the second assembly, and when the tape moves in the second direction, the tape contacts the MFS of the second assembly and is spaced from the MFS of the first assembly.

18. The tape drive of claim 16, wherein the first read module of the first assembly is disposed adjacent to the second read module of the second assembly.

19. The tape drive of claim 18, wherein the first assembly is tilted about 0 degrees to about 15 degrees in a first direction towards the second assembly, and wherein the second assembly is tilted about 0 degrees to about 15 degrees in a second direction opposite the first direction towards the first assembly.

20. The tape drive of claim 16, wherein the first write module of the first assembly is disposed adjacent to the second write module of the second assembly.

21. The tape drive of claim 20, wherein the first assembly is tilted about 0 degrees to about 15 degrees in a first direction away from the second assembly, and wherein the second assembly is tilted about 0 degrees to about 15 degrees in a second direction opposite the first direction away from the first assembly.

* * * * *